(12) United States Patent
Entezarian et al.

(10) Patent No.: US 7,041,159 B2
(45) Date of Patent: May 9, 2006

(54) SEPARATION APPARATUS

(75) Inventors: Majid Entezarian, Hudson, WI (US); Thomas Fitch, St. Paul, MN (US); Richard Smasal, Afton, MN (US)

(73) Assignee: Phillips Plastics Corporation, Phillips, WI (US)

( * ) Notice: Subject to any disclaimer, the term of this patent is extended or adjusted under 35 U.S.C. 154(b) by 101 days.

(21) Appl. No.: 10/632,805

(22) Filed: Aug. 4, 2003

(65) Prior Publication Data

US 2005/0028498 A1   Feb. 10, 2005

(51) Int. Cl.
B01D 50/00 (2006.01)
B01D 45/08 (2006.01)
B01D 53/02 (2006.01)

(52) U.S. Cl. .................. 96/135; 96/139; 55/320; 55/321; 55/444; 55/446; 55/467; 55/486; 55/511; 55/517; 55/518; 55/DIG. 36

(58) Field of Classification Search .............. 55/320, 55/321, 443, 444, 446, 467, 486, 517, 518, 55/520, 511, DIG. 36; 96/135, 139, 134
See application file for complete search history.

(56) References Cited

U.S. PATENT DOCUMENTS

| | | | |
|---|---|---|---|
| 768,415 A | 8/1904 | Wingrove | |
| 1,743,675 A | 1/1930 | Jordahl | |
| 1,872,892 A | 8/1932 | Clanton | |
| 1,926,924 A | 9/1933 | Sylvan | |
| 2,621,755 A | 12/1952 | Gray, Jr. | |
| 2,633,929 A | 4/1953 | Farr | |
| 2,641,331 A | 5/1953 | Hudson | |
| 2,794,514 A | 5/1957 | Risley | |
| 2,886,124 A | 5/1959 | Scharmer | |
| 2,978,064 A | 4/1961 | Deaver | |
| 3,049,399 A | 8/1962 | Gamson et al. | |
| 3,354,623 A | 11/1967 | Keller | |
| 3,433,146 A | 3/1969 | Russell | |
| 3,674,683 A | 7/1972 | Rainer | |
| 3,785,124 A | 1/1974 | Gaylord | |
| 3,837,269 A | 9/1974 | Sweet et al. | |
| 3,854,912 A * | 12/1974 | Terrel et al. | 96/134 |
| 3,955,949 A | 5/1976 | Rohrer | |
| 3,970,558 A | 7/1976 | Lee | |
| 4,022,118 A | 5/1977 | Vandas | |

(Continued)

FOREIGN PATENT DOCUMENTS

DE   836 344   4/1952

(Continued)

OTHER PUBLICATIONS

G. Elliott et al., "The Increasing Use of Ceramic Filters in Air Pollution Control Applications," Filtr. Sep. vol. 34, No. 4, pp. 331-335, 1997, Elsevier Science Ltd.

(Continued)

*Primary Examiner*—Robert A. Hopkins
(74) *Attorney, Agent, or Firm*—Foley & Lardner LLP

(57) ABSTRACT

A separation cartridge is disclosed which comprises a first separation medium, a second separation medium, and a frame. The second separation medium is positioned adjacent to the first separation medium. The frame is configured to hold the first and second separation mediums. The separation cartridge is configured to separate one or more entrained substances from a gas stream in a hood system.

110 Claims, 29 Drawing Sheets

U.S. PATENT DOCUMENTS

| | | | |
|---|---|---|---|
| 4,042,352 A | 8/1977 | Shujiro et al. | |
| 4,082,661 A | 4/1978 | Aoki et al. | |
| 4,104,163 A | 8/1978 | Grutsch | |
| 4,105,422 A * | 8/1978 | Kiguchi | 55/446 |
| 4,118,206 A | 10/1978 | Hagendoorn | |
| 4,126,433 A | 11/1978 | Forssberg et al. | |
| 4,154,812 A | 5/1979 | Sanchez et al. | |
| 4,172,031 A | 10/1979 | Hall et al. | |
| 4,177,142 A | 12/1979 | Halbfoster | |
| 4,231,768 A | 11/1980 | Seibert et al. | |
| 4,235,200 A | 11/1980 | Shay | |
| 4,238,334 A | 12/1980 | Halbfoster | |
| 4,292,285 A | 9/1981 | Nakao et al. | |
| 4,319,898 A | 3/1982 | Maierhofer | |
| 4,321,768 A | 3/1982 | Engehardt | |
| 4,328,105 A | 5/1982 | Arbuckle | |
| 4,350,504 A | 9/1982 | Diachuk | |
| 4,388,086 A | 6/1983 | Bauer et al. | |
| 4,484,563 A | 11/1984 | Fritz et al. | |
| 4,485,622 A | 12/1984 | Takagi et al. | |
| 4,534,775 A | 8/1985 | Frazier | |
| 4,545,792 A | 10/1985 | Huttlin | |
| 4,595,509 A | 6/1986 | Fox et al. | |
| 4,604,110 A | 8/1986 | Frazier | |
| 4,610,705 A | 9/1986 | Sarnosky et al. | |
| 4,629,479 A | 12/1986 | Cantoni | |
| 4,645,605 A | 2/1987 | Durham | |
| 4,682,992 A | 7/1987 | Fuchs | |
| 4,708,000 A | 11/1987 | Besik | |
| 4,721,624 A | 1/1988 | Schumann | |
| 4,805,525 A | 2/1989 | Bivens | |
| 4,811,724 A | 3/1989 | Aalto et al. | |
| 4,816,499 A | 3/1989 | Nomura et al. | |
| 4,830,644 A | 5/1989 | Gutermuth | |
| 4,854,949 A | 8/1989 | Giles, Sr. et al. | |
| 4,872,892 A | 10/1989 | Vartiainen et al. | |
| 4,900,341 A | 2/1990 | Csabai | |
| 4,902,316 A | 2/1990 | Giles, Sr. et al. | |
| 4,908,050 A | 3/1990 | Nagashima et al. | |
| 4,921,509 A | 5/1990 | Maclin | |
| 4,923,725 A * | 5/1990 | Zafiroglu | 428/36.4 |
| 4,944,782 A | 7/1990 | Rajendran et al. | |
| 4,969,936 A | 11/1990 | Schweigert et al. | |
| 4,973,341 A | 11/1990 | Richerson | |
| 4,976,760 A | 12/1990 | Helferich et al. | |
| 5,002,040 A | 3/1991 | MacFarlane | |
| 5,003,693 A | 4/1991 | Atkinson et al. | |
| 5,022,901 A * | 6/1991 | Meunier | 96/134 |
| 5,053,064 A | 10/1991 | Hama et al. | |
| 5,087,272 A | 2/1992 | Nixdorf | |
| 5,124,177 A | 6/1992 | Kasmark, Jr. et al. | |
| 5,133,786 A | 7/1992 | Anderson | |
| 5,145,648 A | 9/1992 | Miyahara et al. | |
| 5,154,743 A | 10/1992 | Takato et al. | |
| 5,171,720 A | 12/1992 | Kawakami | |
| 5,179,061 A | 1/1993 | Haerle | |
| 5,209,887 A | 5/1993 | Von Blücher et al. | |
| 5,211,159 A | 5/1993 | Lieblein et al. | |
| 5,251,608 A | 10/1993 | Cote | |
| 5,288,298 A | 2/1994 | Aston | |
| 5,302,354 A | 4/1994 | Watvedt et al. | |
| RE34,636 E | 6/1994 | Bivens | |
| 5,320,088 A | 6/1994 | Nester | |
| 5,342,422 A | 8/1994 | Wimböck | |
| 5,384,290 A | 1/1995 | Brezny | |
| 5,404,799 A | 4/1995 | Bivens | |
| 5,442,924 A | 8/1995 | Tsai et al. | |
| 5,472,342 A | 12/1995 | Welsh, II et al. | |
| 5,479,907 A | 1/1996 | Walker, Jr. | |
| 5,486,370 A | 1/1996 | Bivens | |
| 5,497,620 A | 3/1996 | Stobbe | |
| 5,512,088 A | 4/1996 | McKenzie | |
| D373,625 S | 9/1996 | Pereira | |
| 5,567,090 A | 10/1996 | Basak et al. | |
| 5,567,392 A | 10/1996 | Becker et al. | |
| 5,595,509 A | 1/1997 | Fry et al. | |
| 5,624,875 A | 4/1997 | Nakanishi et al. | |
| 5,628,916 A | 5/1997 | Stevens et al. | |
| 5,632,889 A | 5/1997 | Tharp | |
| 5,637,124 A | 6/1997 | Diachuk | |
| 5,651,803 A | 7/1997 | Diachuk | |
| 5,669,947 A | 9/1997 | Diachuk | |
| 5,671,726 A | 9/1997 | Hsu | |
| 5,679,120 A | 10/1997 | Yamada et al. | |
| 5,693,298 A | 12/1997 | Bar-Ilan | |
| 5,700,973 A | 12/1997 | Siddiqui | |
| 5,733,350 A | 3/1998 | Muller et al. | |
| 5,750,026 A | 5/1998 | Gadkaree et al. | |
| 5,766,458 A | 6/1998 | Sekhar et al. | |
| 5,776,354 A | 7/1998 | van der Meer et al. | |
| 5,792,360 A | 8/1998 | Algar | |
| 5,810,895 A | 9/1998 | Staehle et al. | |
| 5,874,052 A | 2/1999 | Holland | |
| 5,884,474 A | 3/1999 | Topsoe | |
| 5,902,182 A | 5/1999 | Kramer | |
| 5,964,927 A | 10/1999 | Graham et al. | |
| 5,976,221 A | 11/1999 | Bowman et al. | |
| 5,997,618 A | 12/1999 | Schneider et al. | |
| 6,010,558 A | 1/2000 | Ackland | |
| 6,041,772 A | 3/2000 | Ward et al. | |
| 6,042,628 A | 3/2000 | Nishikiori et al. | |
| 6,050,208 A | 4/2000 | Kennedy | |
| 6,051,199 A | 4/2000 | Teller | |
| 6,074,177 A | 6/2000 | Kobayashi et al. | |
| 6,077,335 A | 6/2000 | Schneider et al. | |
| 6,077,800 A | 6/2000 | Takahashi et al. | |
| 6,079,407 A | 6/2000 | Lai | |
| 6,083,408 A | 7/2000 | Breitenbach et al. | |
| 6,095,037 A | 8/2000 | Savage et al. | |
| 6,099,808 A | 8/2000 | Miller et al. | |
| 6,165,519 A | 12/2000 | Lehrer et al. | |
| 6,168,651 B1 | 1/2001 | Tuma et al. | |
| 6,235,249 B1 | 5/2001 | Fu et al. | |
| 6,237,587 B1 | 5/2001 | Sparling et al. | |
| 6,251,153 B1 | 6/2001 | Neitzel et al. | |
| 6,290,742 B1 | 9/2001 | Pakkala et al. | |
| 6,293,983 B1 | 9/2001 | More | |
| 6,340,379 B1 | 1/2002 | Penth et al. | |
| 6,341,498 B1 | 1/2002 | DiFoggio | |
| 6,344,074 B1 | 2/2002 | Ward et al. | |
| 6,432,177 B1 | 8/2002 | Dallas et al. | |
| 6,454,825 B1 | 9/2002 | Cheimets et al. | |
| 6,464,770 B1 | 10/2002 | Palm et al. | |
| 6,468,323 B1 | 10/2002 | Chwala | |
| 6,471,876 B1 | 10/2002 | Hansen et al. | |
| 6,605,648 B1 | 8/2003 | Johnson et al. | |
| 6,627,088 B1 | 9/2003 | Breitenbach et al. | |
| 6,630,016 B1 | 10/2003 | Koslow | |
| 6,641,788 B1 | 11/2003 | Ogawa et al. | |
| 6,797,041 B1 * | 9/2004 | Brownell et al. | 95/268 |
| 6,814,783 B1 | 11/2004 | Fitch et al. | |
| 6,833,022 B1 | 12/2004 | Feisthammel et al. | |
| 6,843,817 B1 | 1/2005 | Noda et al. | |
| 2003/0024383 A1 | 2/2003 | Roberts et al. | |
| 2003/0024393 A1 | 2/2003 | Lim | |
| 2003/0101986 A1 | 6/2003 | Maier | |
| 2003/0164093 A1 | 9/2003 | Brownell et al. | |
| 2004/0011203 A1 | 1/2004 | Fitch et al. | |
| 2004/0139858 A1 | 7/2004 | Entezarian et al. | |

FOREIGN PATENT DOCUMENTS

| | | |
|---|---|---|
| DE | 1 979 281 | 11/1967 |
| DE | 74 699 | 7/1970 |

| | | |
|---|---|---|
| DE | 2 035 789 | 2/1971 |
| DE | 2 163 183 | 7/1973 |
| DE | 2 206 904 | 9/1973 |
| DE | 74 17 517 | 2/1975 |
| DE | 24 44 741 A1 | 4/1975 |
| DE | 81 02 859 U1 | 7/1981 |
| DE | 33 09 208 A1 | 9/1984 |
| DE | 87 01 860 U1 | 5/1987 |
| DE | 37 12 279 A1 | 10/1988 |
| DE | 40 16 582 A1 | 11/1991 |
| DE | 40 39 855 A1 | 6/1992 |
| DE | 91 05 430 U1 | 10/1992 |
| DE | 41 38 845 A1 | 5/1993 |
| DE | 93 11 478 U1 | 11/1993 |
| DE | 295 11 237 U1 | 6/1996 |
| DE | 196 13 463 A1 | 10/1997 |
| DE | 44 27 074 A1 | 2/1998 |
| DE | 197 05 808 C1 | 6/1998 |
| DE | 299 06 345 U1 | 8/1999 |
| DE | 198 10 818 A1 | 9/1999 |
| DE | 299 06 295 U1 | 9/1999 |
| DE | 200 05 154 U1 | 7/2000 |
| DE | 199 06 318 A1 | 8/2000 |
| DE | 10 126 842 A1 | 12/2002 |
| DE | 10 127 678 A1 | 1/2003 |
| DE | 10 208 474 A1 | 9/2003 |
| EP | 0 007 385 B1 | 2/1980 |
| EP | 0 046 137 B1 | 2/1982 |
| EP | 0 121 809 A1 | 10/1984 |
| EP | 0 263 892 A1 | 4/1988 |
| EP | 0 298 000 A2 | 1/1989 |
| EP | 0 301 640 A1 | 2/1989 |
| EP | 0 398 847 A2 | 11/1990 |
| EP | 0 443 301 A1 | 8/1991 |
| EP | 0 443 673 B1 | 8/1991 |
| EP | 0 612 962 B1 | 8/1994 |
| EP | 0 722 071 B1 | 7/1996 |
| EP | 0 722 072 A2 | 7/1996 |
| EP | 0 726 428 B1 | 8/1996 |
| EP | 0 857 508 B1 | 8/1998 |
| EP | 0 974 790 B1 | 1/2000 |
| EP | 1 055 883 A2 | 11/2000 |
| EP | 1 134 501 A1 | 9/2001 |
| EP | 1 238 679 A1 | 9/2002 |
| FR | 2 066 045 | 8/1971 |
| FR | 2 244 558 | 4/1975 |
| FR | 2 338 092 | 8/1977 |
| FR | 2 423 255 | 11/1979 |
| FR | 2 768 942 | 4/1999 |
| FR | 2 385 998 A1 | 8/2003 |
| GB | 1014594 | 12/1965 |
| GB | 1255268 | 12/1971 |
| GB | 1 434 847 | 5/1976 |
| GB | 1 436 710 | 5/1976 |
| GB | 2 002 106 | 2/1979 |
| GB | 1 551 487 | 8/1979 |
| GB | 2 029 567 | 3/1980 |
| GB | 1 569 146 | 6/1980 |
| GB | 2 141 816 | 3/1985 |
| GB | 2 340 053 | 2/2000 |
| GB | 2 346 643 | 8/2000 |
| WO | WO 97/45189 | 12/1997 |
| WO | WO 02/070105 A3 | 9/2000 |
| WO | WO 02/070105 A2 | 9/2002 |

OTHER PUBLICATIONS

N. Singh et al., "Process Design and Economic Analysis of A Ceramic Membrane System for Microfiltration of Corn Starch Hydrolysate," *Journal of Food Engineering*, vol. 38, No. 1, pp. 57-67, 1998, Elsevier Science Ltd.

M. VandenBoom, Greenheck Product Presentation, 26 pgs., Oct. 23, 2002.

J. Clark, "*Commercial Kitchen Ventilation/IMC-2000*," pp. 1-7 (date unknown).

United Air Specialists, Inc., Promotional Materials for "Smog-Hog,", 4 pgs., 2001.

Greenheck, Various Promotional Materials, 10 pgs., (date unknown).

M. Sherer, "Clearing the Air," pp. 228-231, Foodservice Equipment Report, Jun. 2003.

J. Clark, "Commercial Kitchen Ventilation Design: What You need to Know," Engineered Systems, Jan. 29, 2003.

Grease-X-Tractor™ Centrifugal Filtration, Grease Grabber™ -80 Two-Stage Filtration System, Greenheck, Aug. 2003, 18 pages.

"Greenheck Takes the Grease Out of Kitchen Ventilation," Dec. 2001, 4 pages.

Engineering and Design Adsorption Design Guide, Department of the Army, U.S. Army Corps of Engineers, Mar. 1, 2001, 99 pages, Design Guide No. 1110-1-2.

Greenheck Promotional Materials for "*Grease Grabber*" 80™ (22 pgs.), 2002.

Livchak et a., "*The Facts Mechanical Grease*", American Society of Heating, Refrigerating and Air-Conditioning Engineers, Inc., Copyright 2003, Kitchen Ventilation / A Supplement to ASHRAE Journal Jun. 2003, (p. K14-K17, 4 pgs.).

"*List Prices Effective Jan. 1, 2000, How to Order Flame Gard Grease Filters*", Flame Gard, obtained from website @www.flamegard.com, (4 pgs.).

"*Takmodul med flytande tätning*", Luftfilter, obtained from website www.luftfilter.com, Jun., 2001, (4 pgs.).

"*Filter which puts the environment first*", airMet Metal Filter, Luftfilter, obtained from website @www.luftfilter.com, Oct., 2001, (8 pgs.).

"*Filter som sätter miljön i första rummet*", airMet Metal Filter, Luftfilter, obtained from website @www.luftfilter.com, Feb., 2001, (5 pgs.).

"*We prioritise expertise*", Luftfilter, obtained from website @www.luftfilter.com, Feb., 1999, (4 pgs.).

International Search Report for Application No. PCT/US2004/023377, 6 pages.

Aerosol Science, Davies, C.N., 1966, 6 pages, Academic Press, London and New York.

Aerosols; Science, Technology, and Industrial Applications of Airborne Particles, Liu, Benjamin Y.H., Pui, David Y.H., and Fissan, Heinz J., Sep. 17-21, 1984, 6 pages, Minneapolis, MN.

CRC Handbook of Environmental Control, vol. I: Air Pollution; Richard G. Bond and Conrad P. Straub, 1972, 3 pages, CRC Press, Cleveland, OH.

Desiccant Silica Gel, Siticagel.net, available by at least Oct. 7, 2003, 2 pages.

Fuchs, N.A., The Mechanics of Aerosols, Karpov Institute of Physical Chemistry, Moscow, 1964, 4 pages, The MacMillan Company, NY.

Greenheck, Grease Grabber Filter Style Kitchen Hood, Feb. 2005, 1 page, Greenheck Fan Corp.

Heating, Ventilating and Air-Conditioning, Systems and Equipment, 1996 ASHRAE Handbook, 5 pages, American Society of Heating, Refrigerating and Air-Conditioning Engineers, Inc., Atlanta, GA.

Heating, Ventilating, and Air-Conditioning, Applications, 1999 ASHRAE Handbook, 6 pages, American Society of Heating, Refrigerating and Air-Conditioning Engineers, Inc., Atlanta, GA.

Hinds, William C., Aerosol Technology; Properties, Behavior; and Measurement of Airborne Particles, 1999, 5 pages, John Wiley & Sons.

Jin, Do Won, et al., FTIR Study of Adsorption on Silica Gel for Organic Solvents Diluted in Supercritical Carbon Dioxide, Journal of Chemical Engineering of Japan, abstract, 1996, 1 page.

Latest Development, Meigao Chemical Co., Ltd., copright date of 2002-2005, 3 pages.

Scott, RPW, Liquid Chromatography, obtained from http://www.chromatography-online.org/HPLC/Stationary-Phases/Silica-Gel/rs41.html, marked with 2002-2003 copyright date, 11 pages.

Sell, Nancy J., Industrial Pollution Control, Issues and Techniques; 1981, 7 pages, Van Nostrand Reinhold Company.

Silica Gel, Grace Davison, available at least as of Mar. 8, 2005, 2 pages.

Standard Handbook for Mechanical Engineers, Baumeister, Theodore, Editor, Seventh Edition, 1967, 3 pages, McGraw-Hill, Inc.

International Search Report and Written Opinion for PCT/US2004/032311, mailed on Mar. 1, 2005 (9 pages).

\* cited by examiner

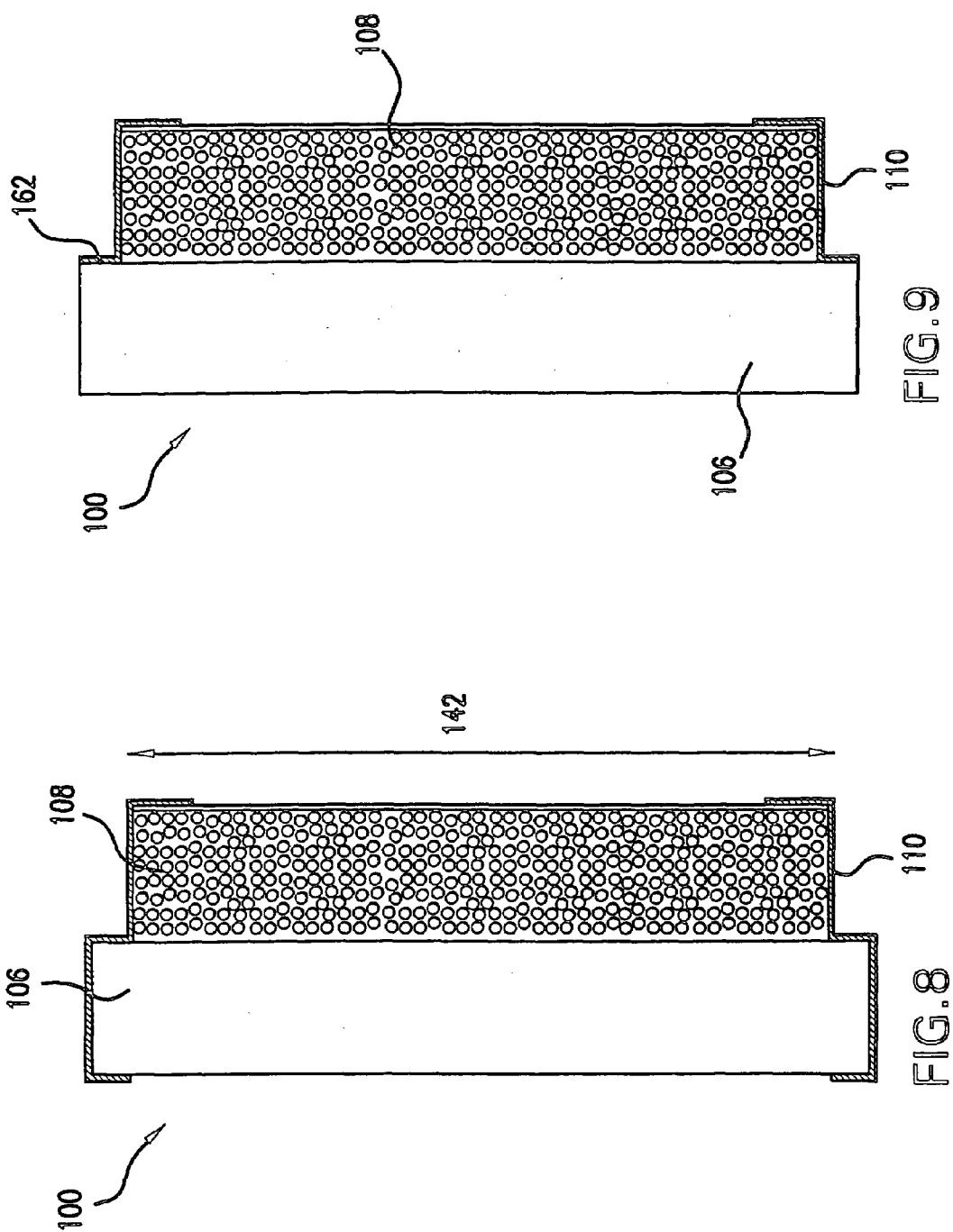

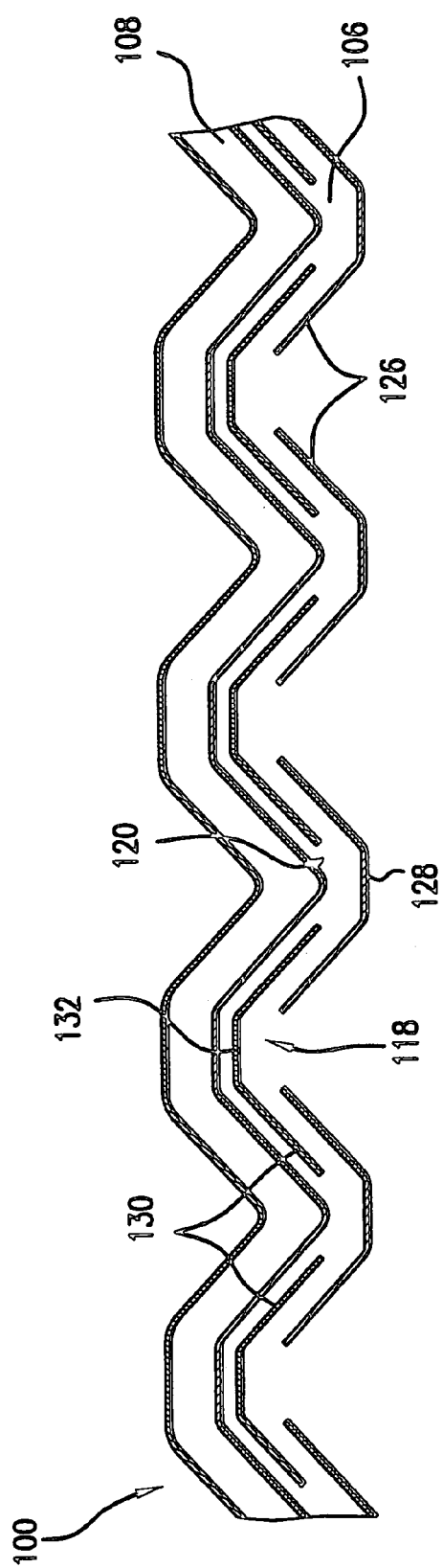
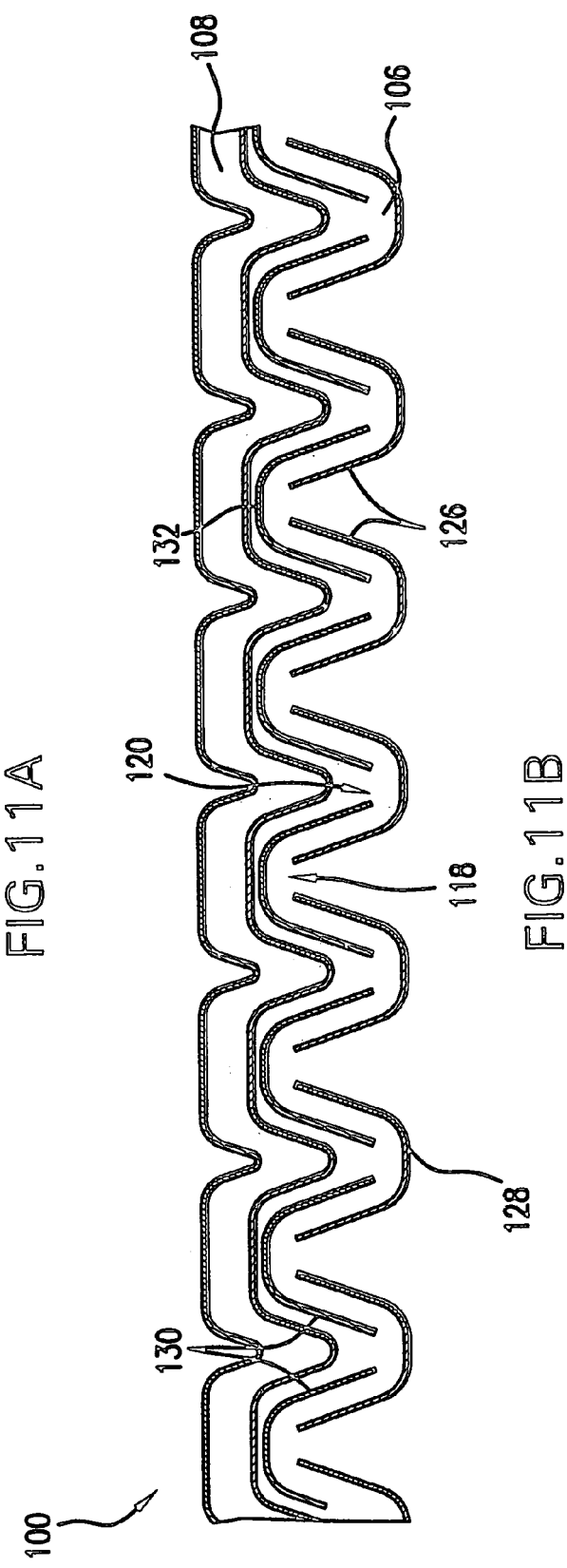

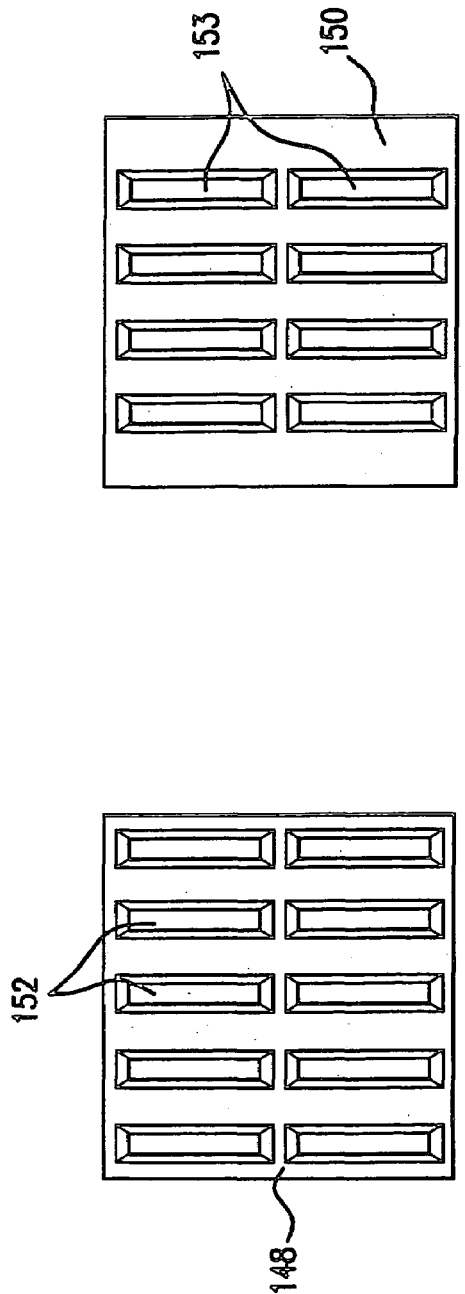
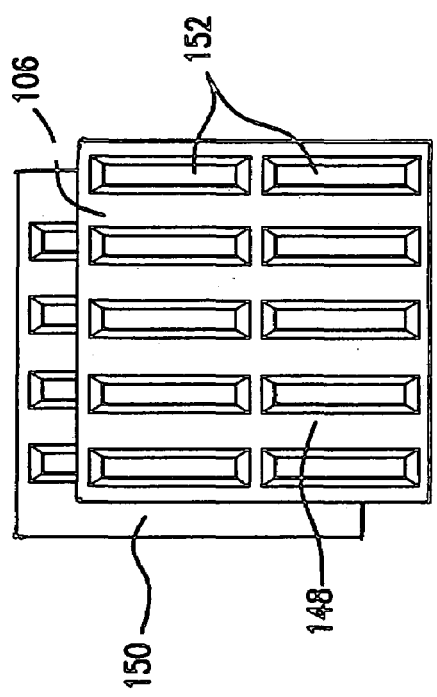
FIG. 15A
FIG. 15B
FIG. 15C

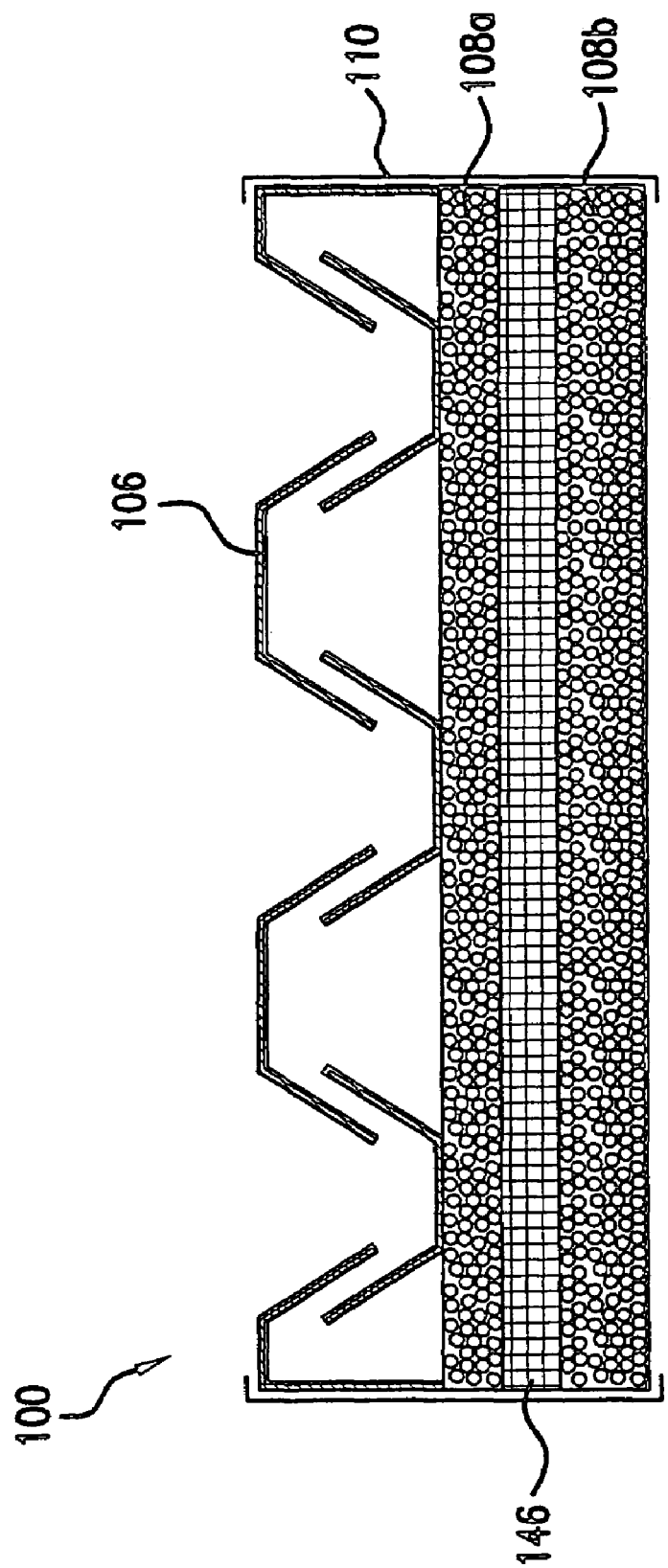

SEPARATION APPARATUS

CROSS-REFERENCE TO RELATED PATENT APPLICATIONS

This application is related to Non-Provisional U.S. patent application Ser. No. 10/363,849, entitled "Filtration Media of Porous Inorganic Particles", filed on Mar. 14, 2003, issued as U.S. Pat. No. 6,814,783 on Nov. 9, 2004, which is incorporated by reference herein.

BACKGROUND

The present disclosure relates generally to the field of separation apparatuses, and, more particularly, to the field of separation apparatuses for a hood.

Cooking foods containing oily substances causes the emission of aerosols and vapors that include substances such as grease, soot, etc. that may coat kitchen hoods and ductwork meant to channel them away from the kitchen environment. Grease that is not deposited on the ductwork is carried to the exterior of a building where it creates further problems. For example, grease buildup on the exterior of a building may cause the building to decay at a faster rate (e.g., grease buildup on a rubber membrane roof) and adversely affect the appearance of the building. Grease deposited at the outlet of the exhaust/duct system may also act as a source of fuel for a fire or as a slippery coating on walkways. To minimize these problems, kitchen hoods have been designed to carry, capture, and contain grease.

Conventional kitchen hoods use a baffle or mesh filter in the hood or ductwork to capture the effluent grease particles. A baffle generally operates by deflecting the exhaust stream as it passes through the baffle so that heavier substances (e.g. liquids such as grease, solids, etc.) impact the surface of the baffle. After impacting the surface of the baffle, these substances drain to a collection area. A mesh filter typically uses fibers or metal scrim to capture the grease in the between the fiber and scrim.

Unfortunately, these conventional filters suffer from a number of deficiencies. These filters generally capture only larger substances and have limited efficiency. Because more of the substances make it through these filters and are deposited inside the ductwork or outside the building, these areas must be cleaned more often, which often entails considerable additional expense. Also, in some instances, conventional filters such as mesh filters need frequent cleaning and/or replacement.

Accordingly, it would be advantageous to provide a more efficient and complete collection system. In providing such a system, it would also be advantageous for the new system to be used in new installations as well as in retrofitting existing installations where space may be limited and it would otherwise be difficult and/or costly to replace the exhaust system.

Accordingly, it is desirable to provide a separation apparatus that provides one or more of these or other advantageous features. Other features and advantages will be made apparent from the present description. The teachings disclosed extend to those embodiments that fall within the scope of the appended claims, regardless of whether they provide one or more of the aforementioned advantages.

SUMMARY

According to one embodiment, a separation cartridge comprises a first separation medium, a second separation medium, and a frame. The second separation medium is positioned adjacent to the first separation medium. The frame is configured to hold the first and second separation mediums. The separation cartridge is configured to separate one or more entrained substances from a gas stream in a hood system.

According to another embodiment, a separation cartridge comprises a separation medium, a packed bed, and a frame. The frame is configured to hold the separation medium and the packed bed. The separation cartridge is configured to separate an entrained substance from a fluid stream.

According to another embodiment, a separation cartridge comprises a plurality of separation mediums and a frame. The frame is configured to hold the plurality of separation mediums. The separation cartridge is configured to separate an entrained substance from a gas stream.

According to another embodiment, a separation apparatus comprises a first plate and a second plate. The first plate comprises entry openings and the second plate comprises exit openings. The second plate is spaced apart from the first plate. The separation apparatus is configured to separate an entrained substance from a gas stream. The entry and exit openings are configured to be offset so that at least a portion of the gas stream passing through the entry openings is deflected before passing through the exit openings.

According to another embodiment, a separation apparatus comprises at least three plates positioned adjacent to one another. Each of the plates comprises openings. The plates are configured to separate an entrained substance from a gas stream in a hood system.

According to another embodiment, a separation system comprises a hood, ductwork coupled to the hood, a fan coupled to the ductwork, and a separation cartridge. The fan is configured to move air including at least one entrained substance from the hood through the ductwork. The separation cartridge is coupled to the hood and/or ductwork and comprises a plurality of separation mediums and a frame configured to hold the separation mediums.

According to another embodiment, a separation system comprises a hood, ductwork coupled to the hood, a fan coupled to the ductwork, and a separation apparatus. The fan is configured to move air from the hood through the ductwork. The separation apparatus is coupled to the hood and/or ductwork and comprises a first plate and a second plate. The first plate comprises entry openings and the second plate comprises exit openings. The second plate is spaced apart from the first plate. The entry and exit openings are configured to be at least substantially offset so that at least a substantial portion of the air passing through the entry openings is deflected before passing through the exit openings.

According to another embodiment, a separation cartridge comprises a first means for separating an entrained substance from a gas using a baffle and/or a mesh filter, a second means for separating an entrained substance from a gas using a packed bed, and a frame configured to hold the first and second means.

BRIEF DESCRIPTION OF THE DRAWINGS

FIG. 8 shows a cross-sectional side view of a separation cartridge according to another exemplary embodiment.

FIG. 9 shows a cross-sectional side view of a separation cartridge according to another exemplary embodiment.

FIG. 11(a) shows a cross-sectional top view of a separation cartridge according to another exemplary embodiment.

FIG. 11(b) shows a cross-sectional top view of a separation cartridge according to another exemplary embodiment.

FIG. 15a shows a perspective view of a baffle according to another exemplary embodiment.

FIG. 15b shows a plate for use in a baffle according to another exemplary embodiment.

FIG. 15c shows a plate for use in a baffle according to another exemplary embodiment.

FIG. 25 shows a cross-sectional top view of a separation cartridge according to another exemplary embodiment.

DETAILED DESCRIPTION OF EXEMPLARY EMBODIMENTS

With reference to the accompanying Figs., the present disclosure relates to separation apparatuses (e.g., separation cartridges, various configurations of separation mediums, etc.) for use in hoods (e.g., commercial kitchen hoods, residential kitchen hoods, etc.), methods of producing such separation apparatuses, and hood systems which utilize such apparatuses. While the subject matter herein is presented in the context of the use of such apparatuses in the field of hoods, such separation apparatuses may be utilized in alternative applications, as will be appreciated by those of ordinary skill (e.g., laboratory hoods, air separation systems, paintspray booths, etc.). The substances collected by the separation apparatuses may include common exhaust substances such as cooking by-products (e.g., grease, soot, etc.). Of course, the separation apparatuses may also be capable of filtering and/or collecting other types of organic, inorganic, hydrophobic, hydrophilic, and/or amphiphilic particles, and may include living organisms such as bacteria and viruses. Also, the particular features and advantages described with regard to one embodiment may also apply to one or all of the other embodiments to the extent possible and/or desirable unless noted otherwise.

Figure 1:
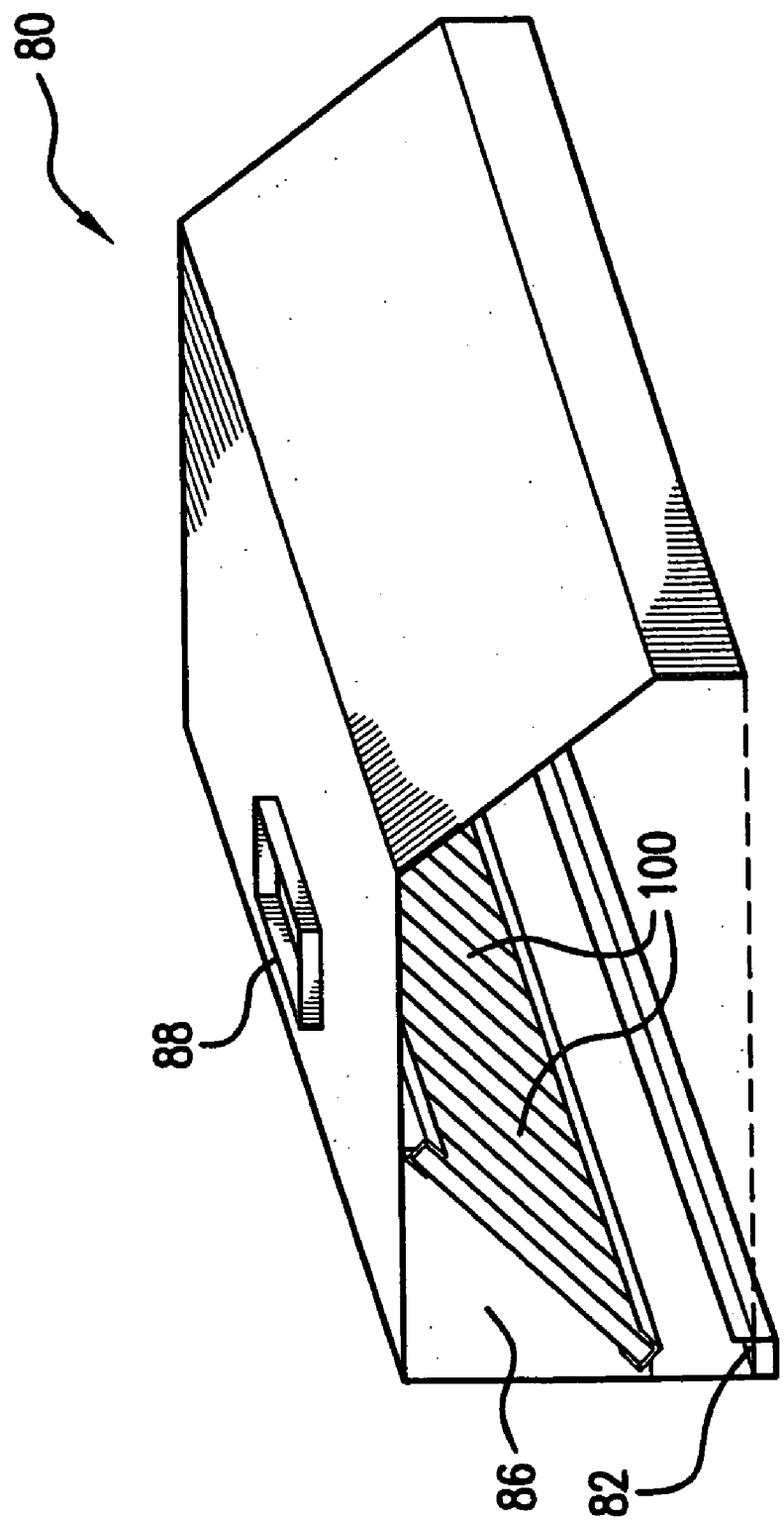
FIG. 1 shows a cross-sectional side perspective view of a hood according to an exemplary embodiment.

Referring to FIG. 1, a cross-sectional side perspective view of an exemplary embodiment of a hood 80 is shown. Hood 80 includes a plurality of separation cartridges 100, a grease trough 82, an exhaust chamber 86, and an exhaust chamber outlet 88. As shown, hood 80 is a tapered canopy hood. However, in other embodiments, hood 80 may be any of a number of different types of hoods such as a box canopy, a V-bank box canopy, etc. that are suitable for use with the separation apparatuses disclosed herein.

In an exemplary embodiment, hood 80 is part of a system that is used to vent cooking exhaust (i.e., air or gas stream including entrained substances) from the interior of a structure, where the cooking is taking place, to the exterior of the structure and into the atmosphere. In addition to hood 80, the system includes ductwork and a fan. The ductwork is coupled to exhaust chamber outlet 88 and extends to the outside of the structure. The fan is used to move the exhaust from hood 80, through the ductwork, and outside of the structure. In one embodiment, the fan is coupled to the ductwork at a position exterior to the structure. In another exemplary embodiment, hood 80 may be part of system that is configured to vent other forms of exhaust. In this embodiment, the system may also include ductwork and fan.

Separation cartridges 100 are generally used to separate substances such as grease, soot, etc. from the gas or air in the exhaust, thus preventing the grease from accumulating in exhaust chamber 86, on the ductwork, and/or at the outlet of the ductwork. Typically, if the substance is grease, then the grease is collected in trough 82. Trough 82 may be configured so that the grease flows into a grease collector. For example, trough 82 may be configured to be sloped so that the grease flows to one or more collectors that allow the grease to be disposed of easily. Accordingly, the collectors may be of any suitable configuration. In one configuration, the collectors can be removed from hood 80. In another configuration, the collectors may also be configured to be permanently affixed to hood 80.

In an exemplary embodiment, separation cartridges 100 are positioned near the opening of exhaust chamber 86. Generally, this position is desirable because the grease is removed before entering exhaust chamber 86 and/or the ductwork. However, in another embodiment, separation cartridges 100 may be positioned in the ductwork or adjacent exhaust chamber outlet 88. In short, separation cartridges 100 may be positioned in any suitable location in hood 80 to provide the desired separation capability.

Figure 2:
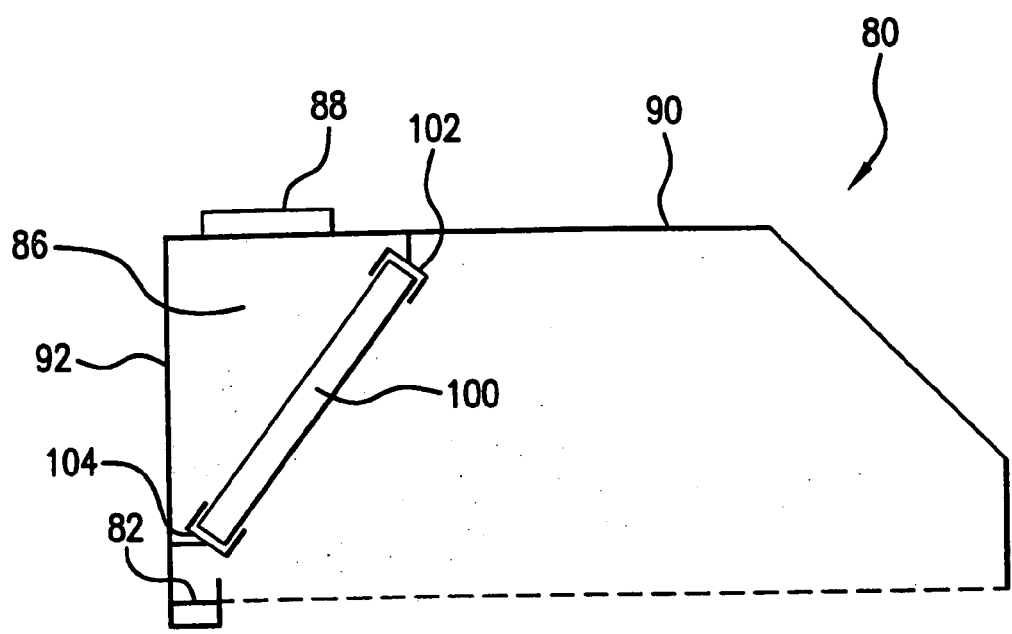
FIG. 2 shows a cross-sectional side view of a hood according to another exemplary embodiment.

Referring to FIG. 2, a cross-sectional side view of hood 80 is shown. In an exemplary embodiment, as shown in FIG. 2, one of separation cartridges 100 is positioned in hood 80 using an upper railing 102 and a lower railing 104. Upper railing 102 extends downward and away from a top 90 of hood 80 and towards a side 92 of hood 80. Lower railing 104 extends upward and outward from side 92 towards top 90. Railings 102 and 104 can be substantially U-shaped, as shown, but can also take other shapes to hold separation cartridge 100 in place. Separation cartridges 100 are configured to be received by and extend between upper railing 102 and lower railing 104.

Figure 3:
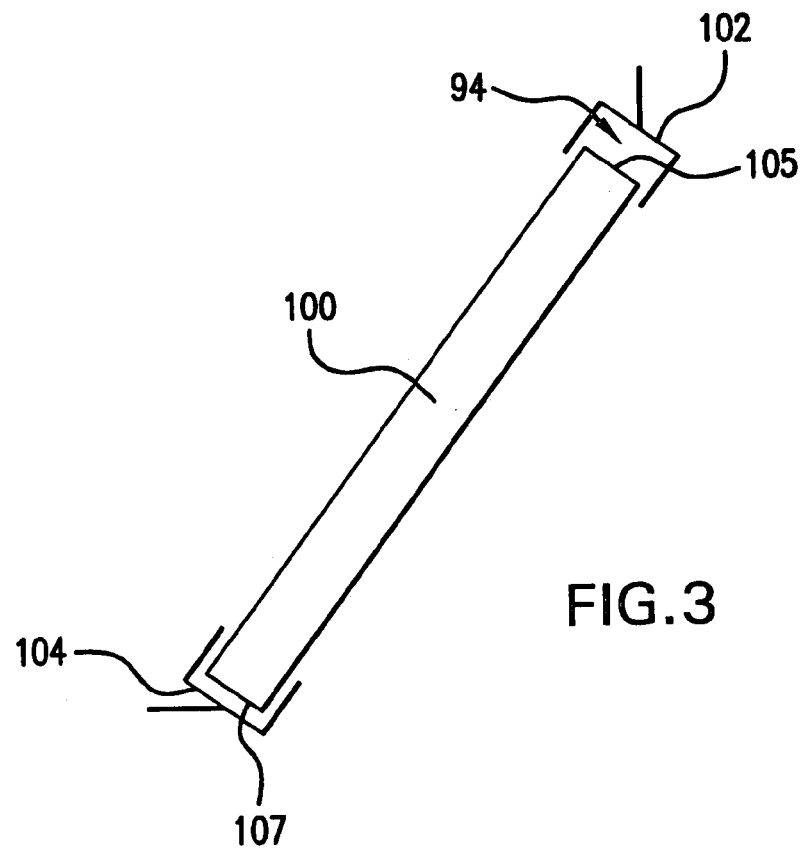
FIG. 3 shows a cross-sectional side view of a separation cartridge according to another exemplary embodiment.

FIG. 3 shows an exemplary embodiment of one of separation cartridges 100 positioned between upper and lower railings 102 and 104 of hood 80. Separation cartridge 100 is positioned as shown by inserting a top side 105 of separation cartridge 100 into upper railing 102 until a bottom side 107 of separation cartridge 100 is able to clear lower railing 104. Bottom side 107 is then moved to a position in line with lower railing 104. At this point, separation cartridge 100 is lowered so that bottom side 107 is positioned in lower railing 104. When bottom side 107 is in lower railing 104, top side 105 is held in place by upper railing 102. However, by lowering bottom side 107, a space 94 is created between top side 105 and upper railing 102. Accordingly, this configuration allows separation cartridge 100 to be easily removed from hood 80 for periodic cleaning and, if necessary, to be replaced.

Of course, other embodiments may be used to position separation cartridge 100 in hood 80. In one embodiment, top side 105 may include a lip with a downward bent leading edge that meshes with a corresponding lip on hood 80 having an upward bent leading edge. In another embodiment, separation cartridge 100 may be positioned in hood 80 using a flip-up clasp. Accordingly, any of a number of suitable devices may be used to position separation cartridge 100 in hood 80.

In an exemplary embodiment, separation cartridge 100 includes at least two separation mediums (e.g., baffle, packed bed, mesh filter, etc.). The separation mediums may separate an entrained substance from a gas or air stream using any of a number of known mechanisms. In one embodiment, the separation medium may be configured to separate an entrained substance using impaction. Impaction occurs when the inertia of a substance in the exhaust causes the substance to impact one or more surfaces of the separation medium. After impacting the surface, the substance typically drains away. In another embodiment, the separation medium may be configured to separate an entrained substance by sieving or capturing the substance in the interstices of a material. In another embodiment, the separation medium may be configured to adsorb and/or absorb the substance. In short, the separation mediums may use any suitable mechanical, electrostatic, and/or chemical mechanism to remove an entrained substance from a gas or air stream. Of course, an individual separation medium may be configured to use one or more of the above described mechanisms.

In an exemplary embodiment, separation cartridge 100 is a stand alone modular structure. The modular structure of separation cartridge 100 may be advantageous because it reduces the number of parts as well as the cost of the overall hood. Also, a modular structure makes it easier to install and remove and makes it easier for separation cartridge 100 to be used in existing hood systems.

Figure 4:
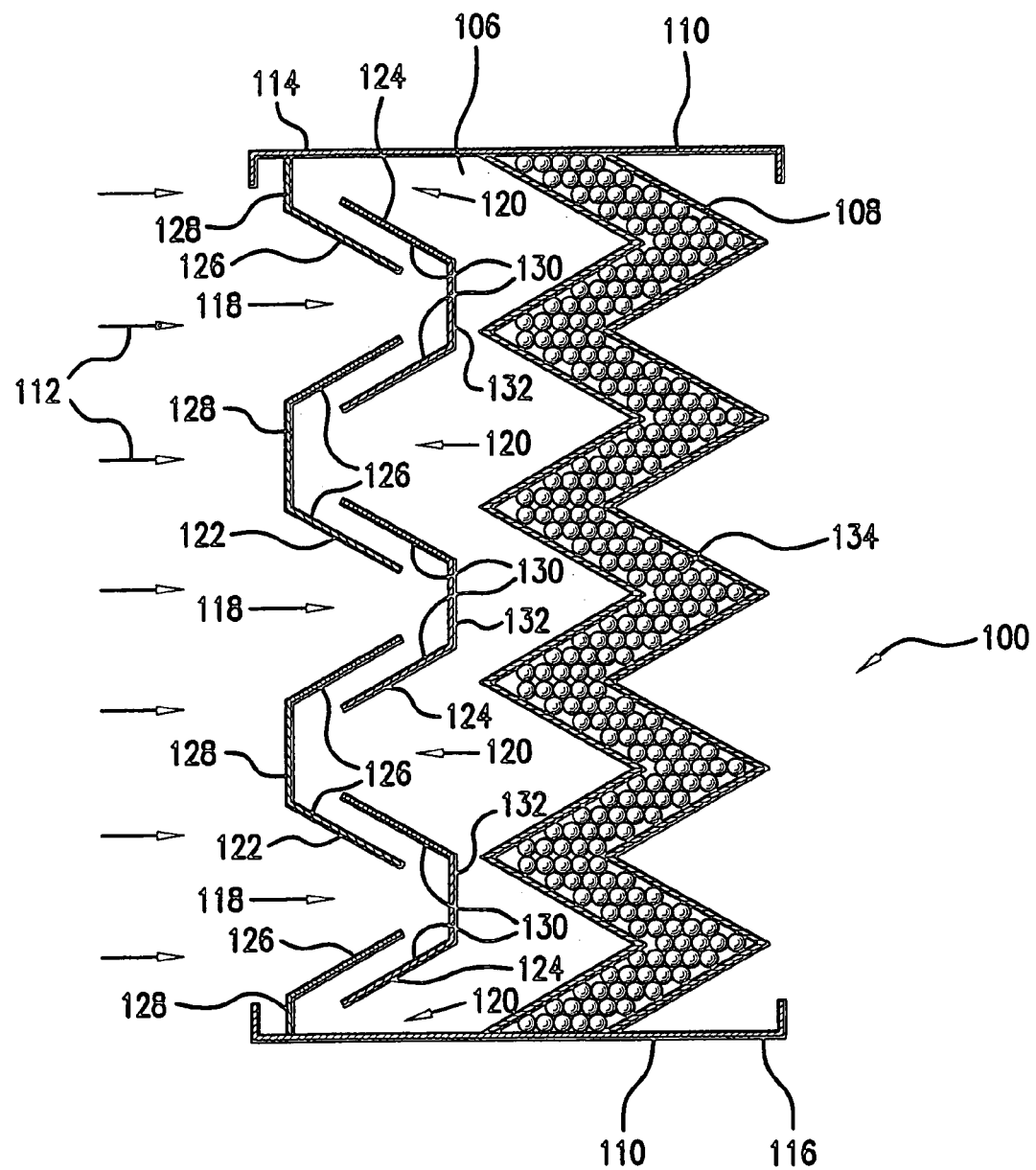
FIG. 4 shows a cross-sectional top view of a separation cartridge according to another exemplary embodiment.

Referring to FIG. 4, a cross sectional top view of an exemplary embodiment of a separation cartridge 100 is shown. As shown in FIG. 4, separation cartridge 100 includes a baffle 106, a packed bed 108, and a frame 110.

It should be understood that, although FIG. 4 shows separation cartridge 100 comprising baffle 106 and packed bed 108, separation cartridge 100 may include any of a number of configurations of separation mediums. For example, in another embodiment, separation cartridge 100 may include a baffle and a mesh filter. In another embodiment, separation cartridge 100 may include a mesh filter and a packed bed. In another embodiment separation cartridge 100 may include a baffle, mesh filter, and a packed bed.

Frame 110 is used to hold baffle 106 and packed bed 108 in position. Frame 110 has a first side 114 and a second side 116. In one embodiment, baffle 106 and packed bed 108 are removably coupled to first and second sides 114 and 116. Thus, if baffle 106 or packed bed 108 needs to be cleaned or replaced, it can be cleaned or replaced individually rather than requiring the entire separation cartridge 100 to be cleaned or replaced. In another embodiment, frame 110 is configured to enclose baffle 106 and packed bed 108 in a removable manner. For example, frame 110 may be configured to pivotably open to allow baffle 106 and packed bed 108 to be removed. Frame 110 may use a hinge on one of its sides so that frame 110 opens in a clamshell type manner. In another embodiment, baffle 106 and packed bed 108 may be fixedly coupled to first and second sides 114 and 116. In another embodiment, baffle 106, packed bed 108, and frame 110 may be fixedly coupled together in a one-piece structure so that they cannot be removed from each other without substantial disassembly of separation cartridge 100 (e.g., baffle 106, packed bed 108, and frame 110 are welded together, etc.).

In an exemplary embodiment, separation cartridge 100 may be configured so that baffle 106 and packed bed, 108 are spaced apart. The space between baffle 106 and packed bed 108 is used to alter the flow of the exhaust through separation cartridge 100. In another embodiment baffle 106 and packed bed 108 are configured to be in contact with each other. This may be desirable in situations where space is at a premium.

Figure 5:
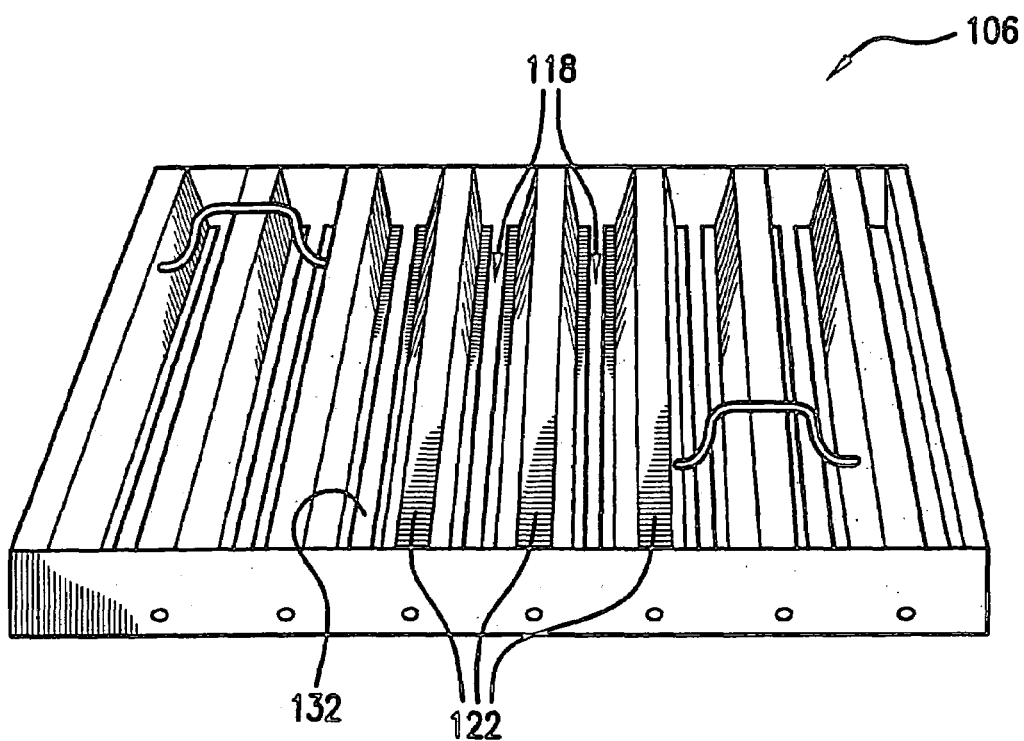
FIG. 5 shows a perspective view of a baffle according to another exemplary embodiment.

Referring to FIGS. 4 and 5, an exemplary embodiment of baffle 106 is shown. Baffle 106 includes entry openings 118, exit openings 120, a first row of deflectors 122, and a second row of deflectors 124. In general, entry openings 118 are where the exhaust enters baffle 106 and exit openings 120 are where the exhaust exits baffle 106. The first row of deflectors 122 define at least a portion of the entry openings 118 and is perpendicular to the width of separation cartridge 100. The second row of deflectors 124 define at least a portion of the exit openings 120 and is also perpendicular to the width of separation cartridge 100. As shown, deflectors 122 include outwardly extending side walls 126 and bases 128. Deflectors 124 include outwardly extending side walls 130 and bases 132. In general, side walls 126 of deflectors 122 face side walls 130 of deflectors 124 in an offset opposing relationship. Thus, bases 128 are positioned opposite exit openings 120 and bases 132 are positioned opposite entry openings 118.

Figure 20:
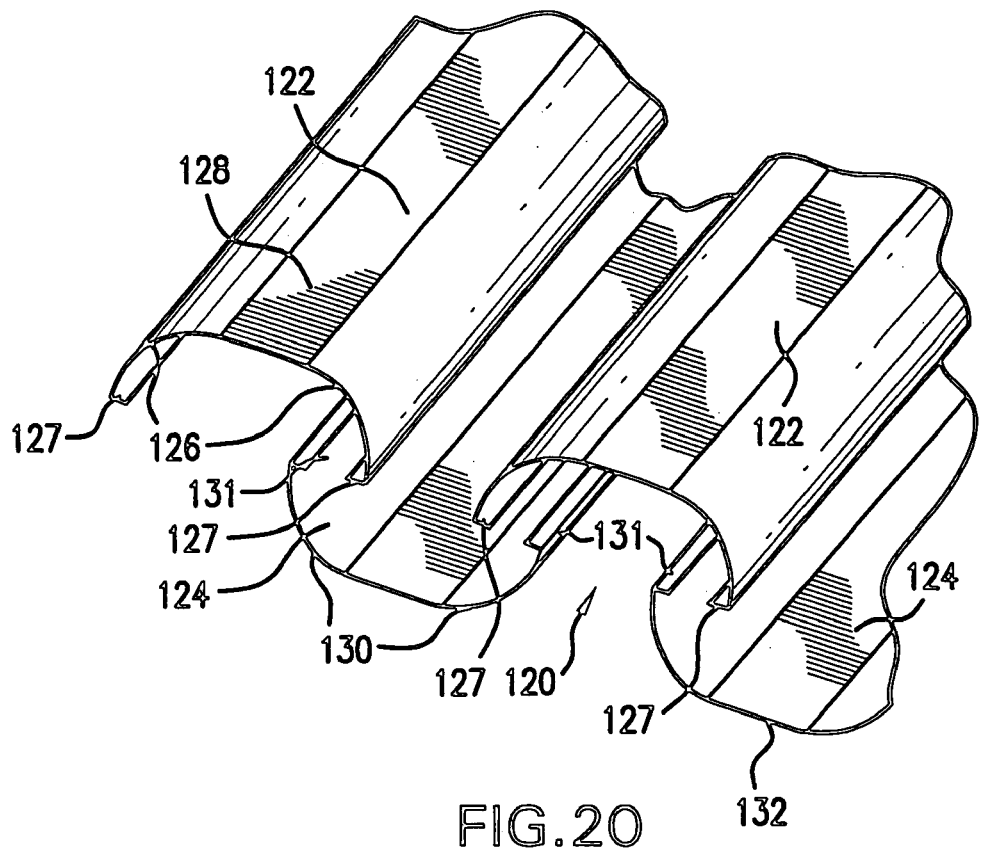
FIG. 20 shows a perspective view of a baffle according to another exemplary embodiment.

Referring to FIG. 20, another exemplary embodiment of baffle 106 is shown. In this embodiment, side walls 126 and 130 are generally curved and include lips 127 and 131, respectively. It should be understood that baffle 106 may be configured in any of a number of ways. Also, to the extent that baffle 106 includes side walls 126 and/or 130, they may be any suitable shape such as flat, curved, etc.

The opposing rows of deflectors 122 and 124 prevents the exhaust from passing directly through without being deflected. In general, the exhaust passes through entry openings 118 and is deflected by deflectors 124 so that the exhaust passes between side walls 126 and 130. The exhaust is then deflected again by deflectors 122 before it passes out of exit openings 120 and into packed bed 108.

As the exhaust travels through baffle 106 and is deflected by deflectors 122 and 124, the larger substances, such as entrained grease, collide with deflectors 122 and 124 and run down to grease trough 82. The substances can then be disposed of accordingly.

Figure 26:
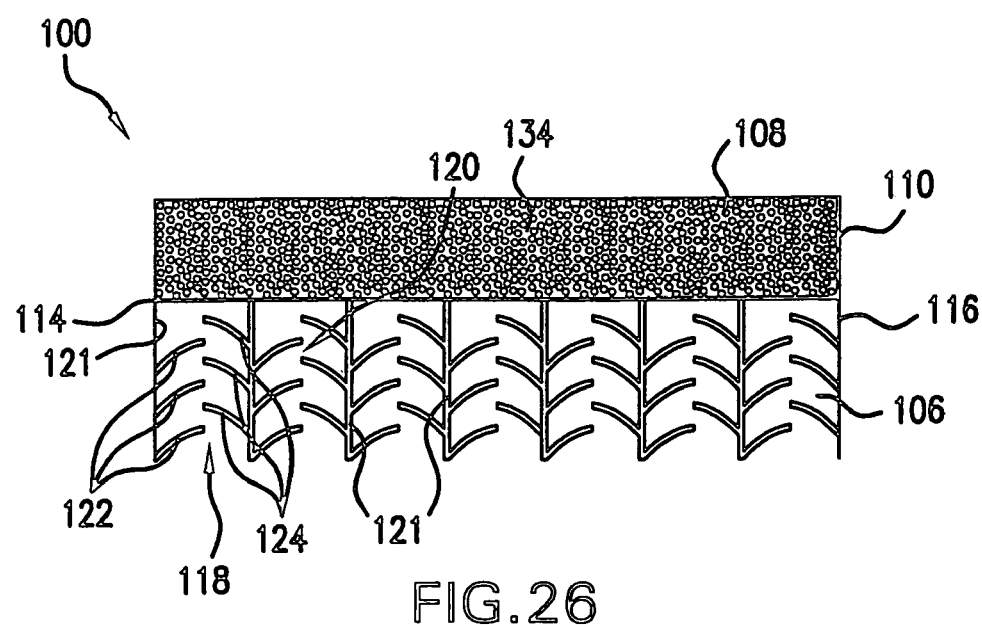
FIG. 26 shows a cross-sectional top view of a separation cartridge according to another exemplary embodiment.

Referring to FIG. 26, another exemplary embodiment of baffle 106 is shown. In this embodiment, baffle 106 includes first and second rows of deflectors 122 and 124 where each row is configured to traverse the width of separation cartridge 100. In this embodiment, deflectors 122 are generally curved and extend outwardly from walls 121. Deflectors 124 are also generally curved and extend outwardly from walls 121 towards deflectors 122. Deflectors 122 and 124 overlap so that exhaust passing through entry openings 118 is deflected as it travels between deflectors 122 and 124 before passing through exit openings 120.

In an exemplary embodiment, shown in FIGS. 4 and 26, packed bed 108 comprises media 134 that is used to separate the entrained substances from the exhaust. In general, packed bed 108 uses a variety of the mechanisms described above to separate entrained substances from a gas or air stream. For example, the entrained substances may be separated from a gas or air stream by causing the heavier substances to impact the media and drain away. Also, the substances may be entrapped in the interstices of media 134. Further still, the substances may be adsorbed by media 134. When media 134 is porous, the substances may also be absorbed. Accordingly, packed bed 108 may operate to separate entrained substances using impaction, sieving, adsorption, and/or absorption. Of course, packed bed 108 may also use other mechanisms to separate entrained substances.

In an exemplary embodiment, media 134 comprises porous and/or solid inorganic media as described in U.S. patent application Ser. No. 10/363,849, filed on Mar. 14, 2003. In an exemplary embodiment, media 134 comprises porous inorganic media that generally has an external surface area and a network of pores that define internal surfaces. The use of porous media may be advantageous because the pores can absorb the captured substances and, thus, increase the amount of time between cleanings as opposed to solid media. In an exemplary embodiment, the pores have a mean size between approximately 0.01 to approximately 100 microns or, desirably, between approximately 0.1 microns to approximately 10 microns. In one embodiment, the media includes a distribution of pore sizes ranging from approximately 0.1 microns to approximately 100 microns, or, desirably, from approximately 0.1 microns to approximately 10 microns.

In an exemplary embodiment, porous inorganic media may have a porosity in the range of 15–95%, desirably 30–70%. These internal surfaces accordingly are exposed to the substance(s) passing through the network of particles. That is, the pores of the inorganic media are large enough such that the substances can fit inside of, or otherwise pass through, one or more pores. Accordingly, in one embodiment, the surfaces of the pores can comprise an oleophilic substance and, therefore, attract an oleo substance (e.g., grease). In this sense, a relatively powerful force, such as surface tension, can draw the substance within the openings of the pores. Hence, the substance, such as an oleo substance, can collect within the pores in lieu of and/or in addition to adhering to the exterior surface area of the particles.

Porous and/or solid inorganic media may comprise any inorganic material that confers the requisite characteristics upon the media (e.g. capable of containing pores, at least substantially maintains porosity and ability to collect a substance inside the pores of the media). An illustrative list of suitable materials of which the media can be comprised include: metals and their oxides, ceramic materials such as transition metal oxides, zircon, zirconia, titania, silica, alumina, alumina-silica (clay) or a variable blend thereof. In one embodiment, the media is a clay such as kaolin, bentonite or montmorillonite. Porous iron also absorbs oleo substances such as grease.

The porous and/or solid inorganic media particles can have any suitable shape (e.g., spherical, pellet-like, fibers, rings, saddles, etc.). Also, the media may have any suitable size depending on the particular use. For example, the media may range in size from about 0.25–4 mm, or, desirably, 0.33–3.5 mm, or, suitably, 0.5–3 mm. For spherical media, the size measurement is diameter of the particle; and for non-spherical media, the size measurement is taken at the largest dimension. In one embodiment, media particles can have a size that ranges from greater than 4 mm and, desirably, from greater than 4 millimeters to 50 millimeters or even 100 millimeters. In an exemplary embodiment, the media particles may comprise a plurality of particle sizes (e.g., particles of two, three, four, or more sizes as well as a distribution of particle sizes). For example, media 134 may include particles that are 4 millimeters and 10 millimeters in size. In another exemplary embodiment, the media particles may include a distribution of particle sizes so that at least approximately 80%, or, desirably, at least approximately 90%, or suitably, substantially all of the particles fall within a range of particle sizes (e.g., approximately 0.5 millimeters to approximately 2 millimeters, or desirably approximately 0.9 millimeters to approximately 1.7 millimeters). In another embodiment, the media particles may be configured to be of all different sizes and shapes.

The individual media particles, once formed, can be assembled into a network suitable for filtering the one or more substances from the fluid composition. Media 134 can be arranged as a packed bed 108 in a vertical plane, a horizontal plane or both. Preferably, each particle interacts with at least one other particle, yet forms interstices between the particles, such that a fluid can pass through the interstices. In one embodiment, the porous particles form a bed that defines a constant surface area. The particles preferably extend along at least the horizontal or vertical cross section of the bed or casing to define a continuous section of alternating particles and interstices. An example is a bed of particles packed within a perforated or porous wall container. Alternatively, two or more particles of the bed may be physically attached, such as by heating the particles to sufficient temperature to sinter the particles together, while maintaining space between the particles sufficient to allow the passage of a fluid there through.

Once formed, media 134, which can be in the form of the network described above, can be placed into contact with a fluid composition, such as exhaust (e.g., cooking exhaust, etc.), containing the substance to be filtered. The particles may be positioned in association with a fluid such that the fluid passes through or at least substantially through the interstices and/or pores of inorganic particles, leaving behind at least a portion, but desirably the majority, of the substance suspended in the fluid. In this sense, the substance collects on and within the inorganic particles.

In an exemplary embodiment, the pressure drop across packed bed 108 is configured to be suitable for hoods such as commercial kitchen hoods or other similar hoods. For example, packed bed 108 may have a pressure drop of not greater than approximately 500 pascals, or desirably, not greater than approximately 375 pascals. Of course, the particular pressure drop across packed bed 108 is dependent on the conditions of its use. Accordingly, the pressure drop across packed bed 108 may be any suitable pressure drop. As a general rule, there is a tradeoff between separation efficiency and pressure drop. Typically, as the pressure drop increases the efficiency of packed bed 108 increases.

The pressure drop across packed bed 108 may be dependent on a number of characteristics such as the bed depth, media size, and exhaust velocity (the velocity of the fluid flowing through the separation apparatus is the face velocity unless noted otherwise). The Ergun equation shown below may be used to model the pressure drop across a packed bed.

$$\frac{\Delta p}{D_b} = 150 \cdot \frac{(1-\varepsilon)^2}{\varepsilon^3} \cdot \frac{\mu_f \cdot U}{(\varphi \cdot d_m)^2} + 1.75 \cdot \frac{(1-\varepsilon)}{\varepsilon^3} \cdot \frac{\rho_f \cdot U^2}{\varphi \cdot d_m}$$

The variables in the Ergun equation are as follows. $\varepsilon$ is the void volume of packed bed 108. $\mu_f$ is the viscosity of the fluid passing through packed bed 108. U is the superficial velocity, which is $v \cdot \varepsilon$ where v is the mean fluid velocity. $d_m$ is the mean particle size (e.g., diameter of spherical particles, largest dimension for non-spherical particles, etc.). $\rho_f$ is the density of the fluid. $D_b$ is the bed depth of packed bed 108. $\phi$ is the shape correction factor, which varies from 0 to 1.0.

Generally, as may be seen from the Ergun equation, as the bed depth increases, the pressure drop also increases. Likewise, as the media size increases, the pressure drop decreases. Also, as the exhaust velocity increases, the pressure drop increases.

In general, it is desirable to decrease the pressure drop across packed bed 108 and still provide the desired separation efficiency. Decreasing the pressure drop may reduce the size requirements of the fan that is used in conjunction with hood 80 and may result in less energy being used to move the exhaust through hood 80.

In an exemplary embodiment, shown in FIG. 4, packed bed 108 has a pleated shape. This configuration reduces the pressure drop relative to a flat packed bed. The smaller pressure drop is due to the larger cross sectional area of packed bed 108 through which the exhaust can pass. Assuming a constant volumetric flow of exhaust, the increased cross-sectional area for the exhaust to pass through results in a lower exhaust velocity at packed bed 108 and, hence, a lower pressure drop.

Referring to FIG. 6, a number of examples of pleated geometries for packed bed 108 are shown. These examples show how the geometry of packed bed 108 affects the cross sectional area through which the exhaust flows. The increased cross sectional area of a pleated packed bed may be represented as a multiple of the cross sectional area of a flat packed bed. This number is referred to as the multiplier factor. The multiplier factor is determined using the following equation:

$$\text{Multiplier factor} = \frac{(\text{Length of each pleat}) \cdot (\text{Number of pleats})}{\text{Length of a flat packed bed}}$$

It should be noted that this equation is a simplified version (i.e., the height of the pleated packed bed and the flat packed bed is assumed to be the same and thus cancels out leaving only the length) of the full equation, which would be written as the cross sectional area of the pleated packed bed divided by the cross-sectional area of the flat packed bed.

By knowing the effect on the pressure drop, the geometry of packed bed 108 can be chosen to meet the pressure drop requirements of a particular hood. For example, if separation cartridge 100 is used to replace a different type of filter in an existing hood, it may be undesirable to increase the pressure drop and thus decrease the amount of air that the hood is capable of handling. In order to prevent this from happening, the pressure drop of separation cartridge 100 may be designed to be similar to that of the filter previously used in the hood. This may be done by adjusting the parameters in the above equation to provide an acceptable multiplier factor. Of course, the variables shown in the Ergun equation may also be modified as well (e.g., depth of the packed bed, media size, etc.).

Using FIG. 6(a) as an example, the multiplier factor is obtained for a particular pleated geometry as follows. The first step in the process is to determine the length of each pleat that has a rectangular cross section (this length is represented by 138 in FIG. 6 for the various pleated geometries). This length is then multiplied by the total number of pleats as shown in the above equation. The length of each pleat in FIG. 6(a) is 2.98 centimeters. The number of pleats is 7.5 and the length of a flat packed bed is 10.49 centimeters. Using these numbers in the equation results in a multiplier factor of approximately 2.1. The multiplier factors for the remaining geometries may be obtained in a similar manner. Table 1 shows the multiplier factors for each of the geometries shown in FIG. 6 as well as the parameters used to obtain the factors. It should be noted that the length of the pleats for FIG. 6(g) was adjusted to account for the turns in the pleat that are unaccounted for otherwise.

TABLE 1

Figure 6B:
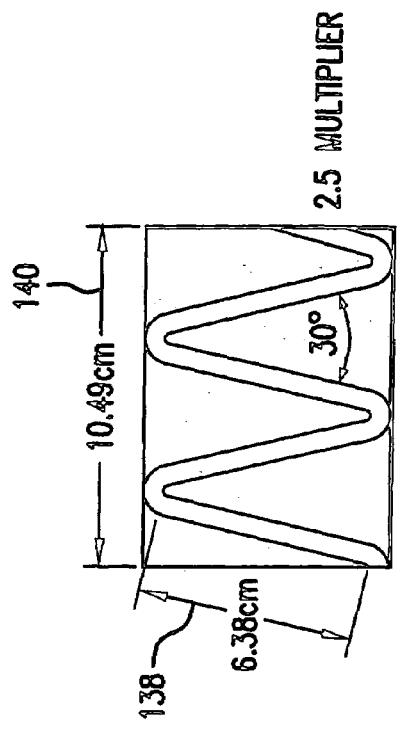
FIG. 6 shows various pleated geometries for a packed bed according to another exemplary embodiment.
Figure 6A:
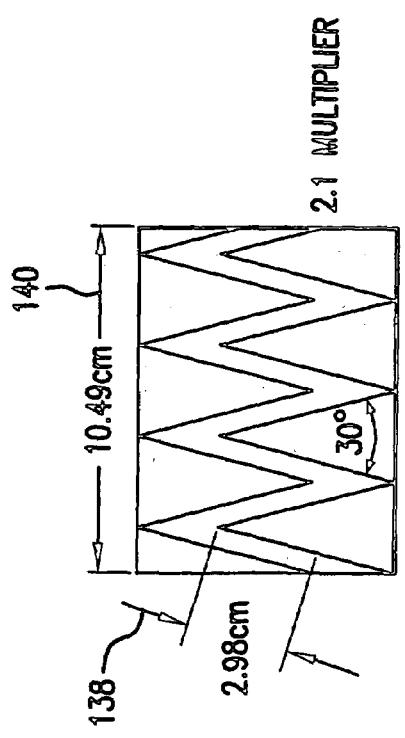
Figure 6D:
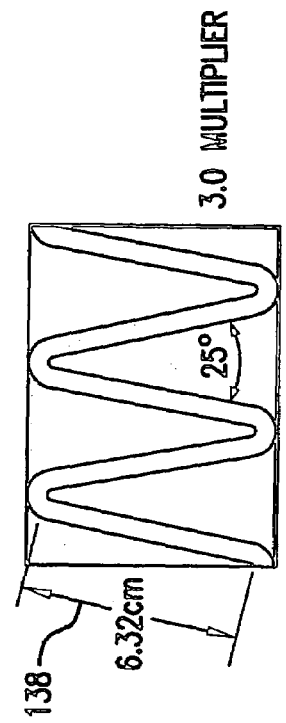
Figure 6C:
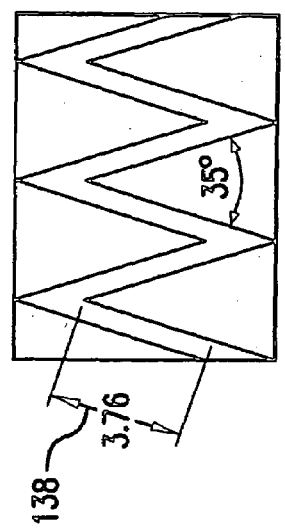
Figure 6E:
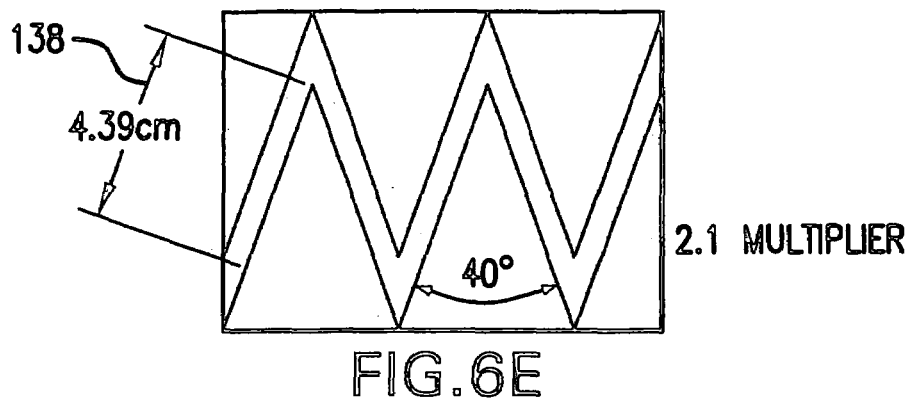
Figure 6F:
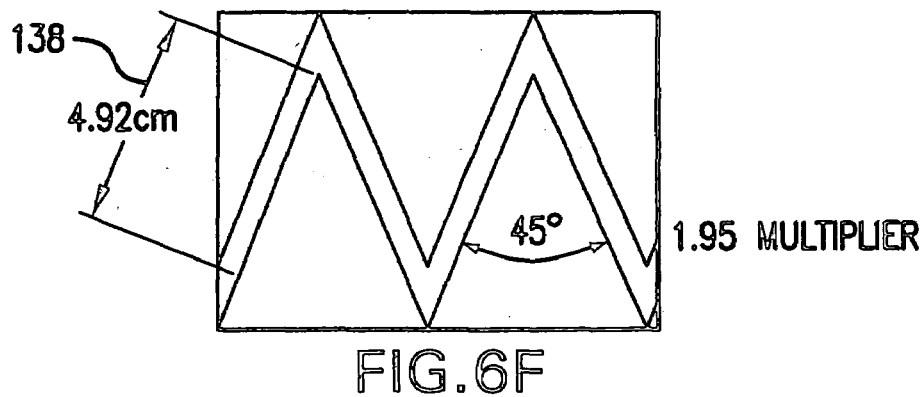

| Figure | Length of Pleat (cm) | Number of Pleats | Multiplier Factor |
|---|---|---|---|
| FIG. 6(a) | 2.98 | 7.5 | 2.1 |
| FIG. 6(b) | 6.38 | 4.15 | 2.5 |
| FIG. 6(c) | 3.76 | 6 | 2.15 |
| FIG. 6(d) | 6.32 | 5 | 3.0 |
| FIG. 6(e) | 4.39 | 5 | 2.1 |
| FIG. 6(f) | 4.92 | 4.15 | 1.95 |

TABLE 1-continued

Figure 6G:
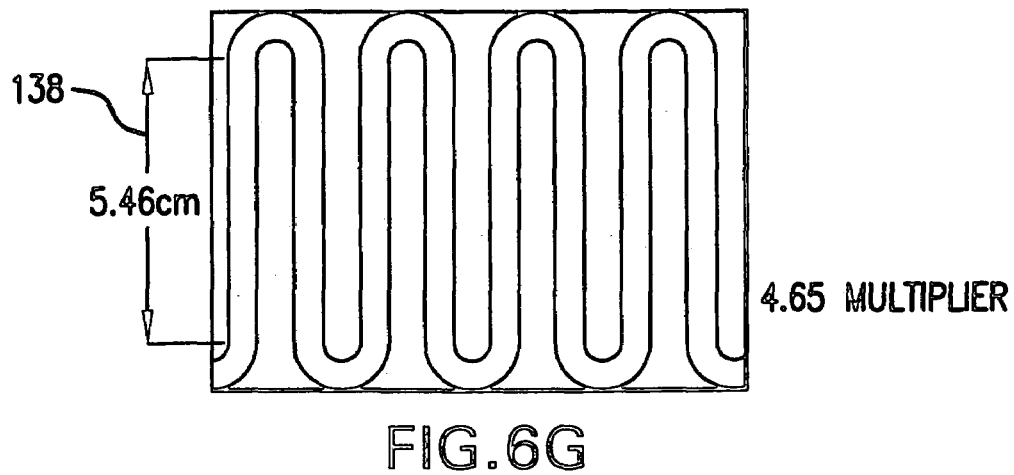

| Figure | Length of Pleat (cm) | Number of Pleats | Multiplier Factor |
|---|---|---|---|
| FIG. 6(g) | 5.46 | 10 | 4.65 |

In the embodiment shown in FIG. 4, exhaust passes through separation cartridge 100 in the direction shown by arrows 112. In this manner, the exhaust initially passes through baffle 106 to remove the larger substances and is then passed through packed bed 108 to remove the smaller substances. This configuration of separation cartridge 100 is generally desirable because baffle 106 may not be as efficient at removing substances smaller than a certain size (e.g., ten microns or eight microns) as packed bed 108. Accordingly, baffle 106 is used to remove the larger substances first and then packed bed 108 is used to remove the smaller substances as well as any larger substances that may have passed through baffle 106. In an alternative embodiment, packed bed 108 may be placed in front of baffle 106 so that the exhaust first passes through packed bed 108.

Figure 7:
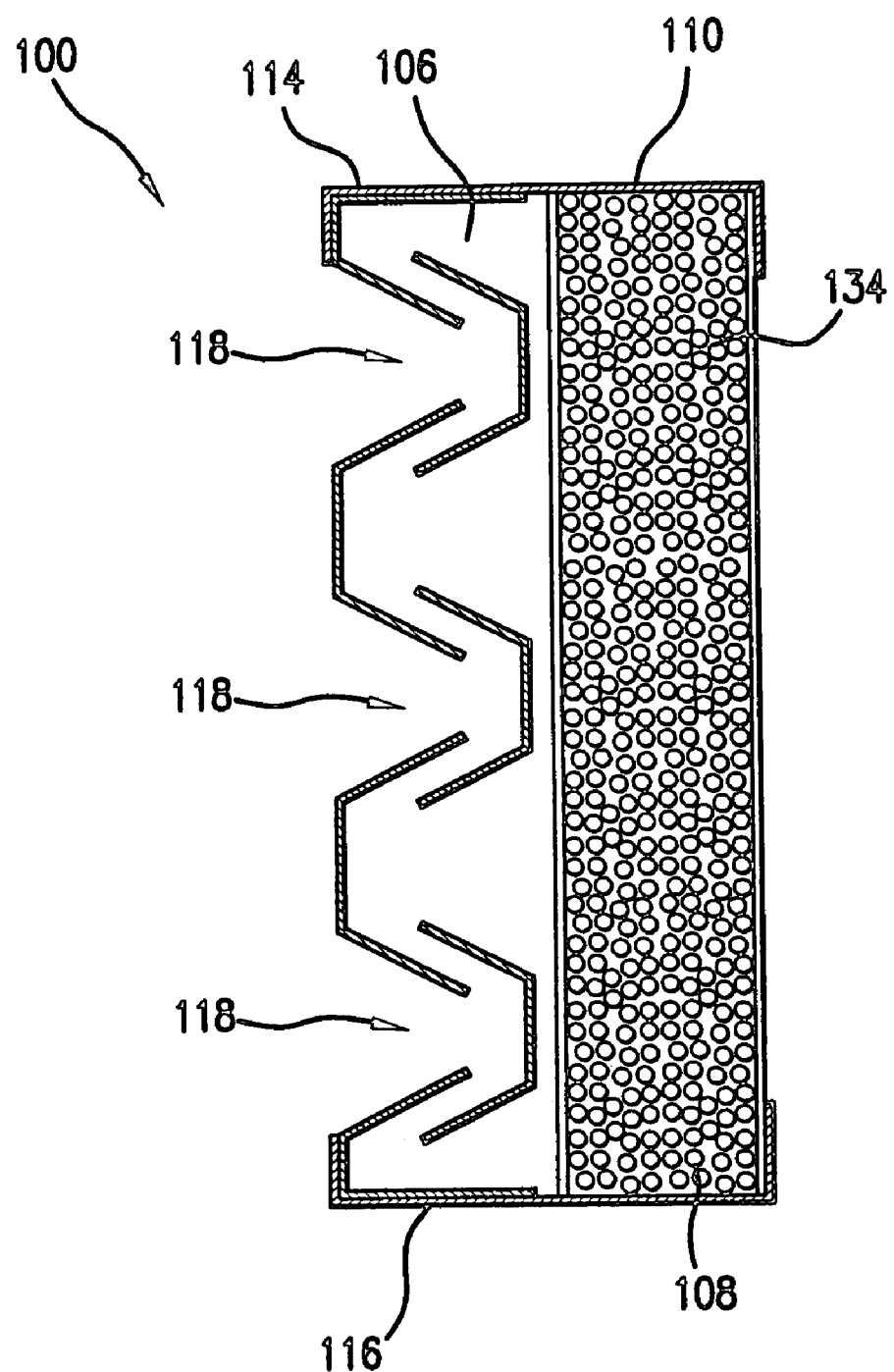
FIG. 7 shows a cross-sectional top view of a separation cartridge according to another exemplary embodiment.

Referring to FIG. 7, a cross-sectional top view of an exemplary embodiment of separation cartridge 100 is shown. In this embodiment packed bed 108 is flat. This configuration may be suitable for those situations where there is not enough space in separation cartridge 100 to allow flat bed 100 to be pleated. Of course, as explained previously, the geometry of packed bed 108 may depend on a number of factors unique to the particular application.

In an exemplary embodiment, separation cartridge 100 is configured to be used in an already existing hood. Advantageously, this allows separation cartridge 100 to be used to replace cartridges that may be used in existing hoods. In conventional existing kitchen hoods, the width of railings 102 and 104 is typically approximately 1.3 centimeters to approximately 7.6 centimeters and, more desirably, is approximately 3.5 centimeters to approximately 5.1 centimeters. Accordingly, separation cartridge 100 may be approximately 2.6 centimeters to approximately 6.4 centimeters wide or, desirably, approximately 3.8 centimeters to approximately 4.8 centimeters wide. Of course, separation cartridge 100 may be configured to be any size that corresponds to the particular hood. In an alternative embodiment, separation cartridge 100 may be incorporated into a newly built hood that is custom designed to use separation cartridge 100. In this embodiment, separation cartridge 100 may be any of a number of suitable dimensions.

Referring to FIGS. 8 and 9, cross-sectional side views of further embodiments of separation cartridge 100 are shown. In these embodiments, the height, represented by arrow 142, of packed bed 108 is reduced relative to that of baffle 106. This is done so that a second separation medium such as packed bed 108 may be used with existing baffles. Thus, baffle 106, in this embodiment, represents a commercially available baffle that is traditionally used in conjunction with hood 80. The height of packed bed 108 was reduced so that separation cartridge 100 would still fit in railings 102 and 104.

In an exemplary embodiment, as shown in FIG. 8, baffle 106 and packed bed 108 are coupled together using frame 110. In this embodiment, frame 110 is configured to wrap around both baffle 106 and packed bed 108. In FIG. 9, baffle 106 and packed bed 108 are coupled together according to another embodiment. In this embodiment, frame 110 does not wrap around baffle 106. Instead, frame 110 attaches to a back side 162 of baffle 106 and wraps around packed bed 108. In one embodiment, packed bed 108 is the same length as baffle 106. In another embodiment, packed bed 108 covers at least approximately 80% to approximately 95% of the surface area of back side 162. Of course a number of other embodiments may also be used to couple packed bed 108 to baffle 106. For example, packed bed 108 may be welded to baffle 106. Packed bed 108 may also be coupled to baffle 106 using removable and/or permanent fasteners, including without limitation, screws, rivets, snaps, locks, and/or inserts. Packed bed 108 may also be pivotably coupled to baffle 106 to allow for easy removal and/or inspection.

Figure 10:
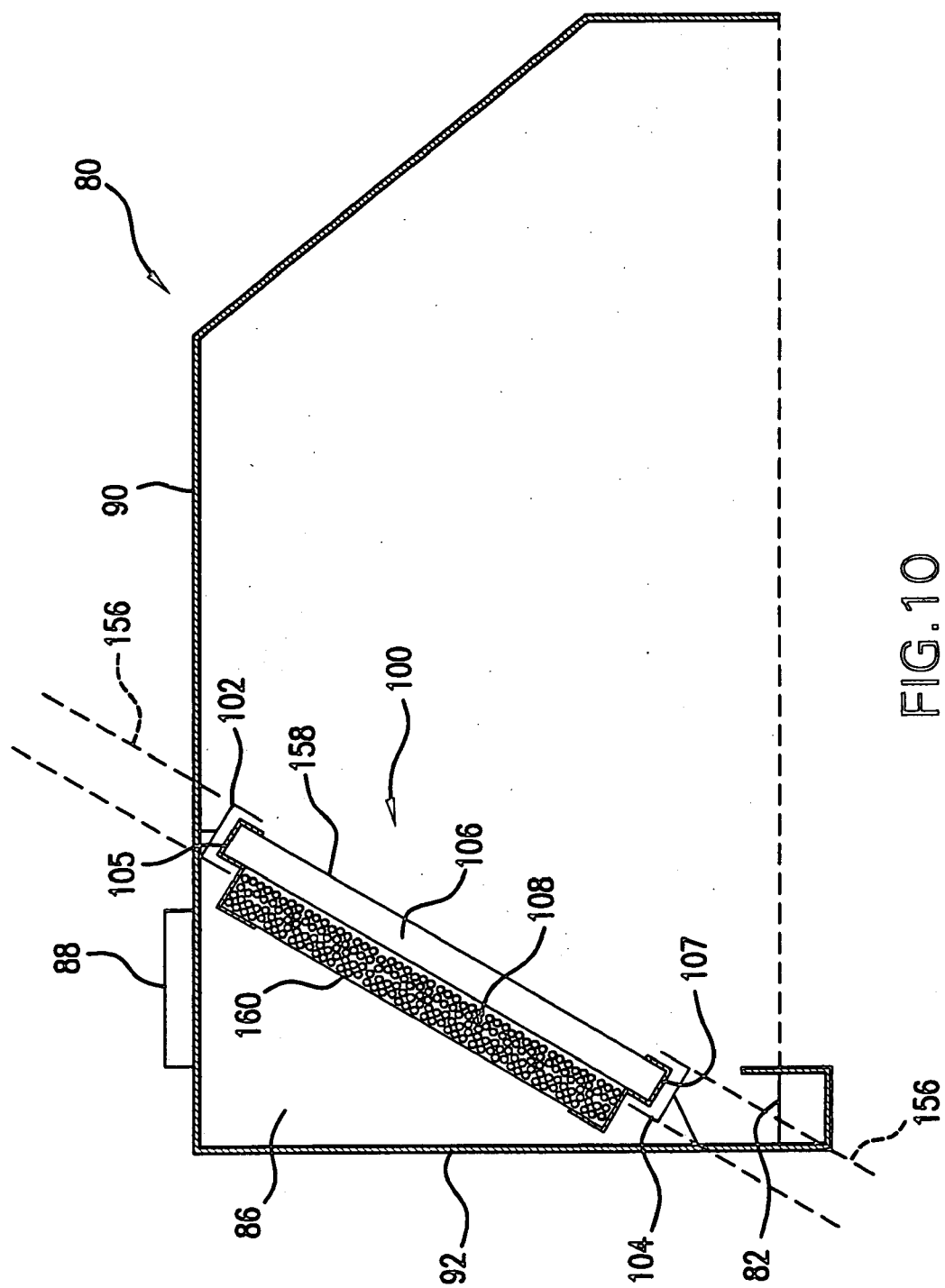
FIG. 10 shows a cross-sectional side view of a hood according to another exemplary embodiment.

As shown in FIG. 10, the space between lower railing 104 and side 92 of hood 80 is often limited. Typically, this space is approximately 7.6 centimeters to approximately 12.7 centimeters. Since railings 102 and 104 are often approximately 3.5 centimeters to approximately 5.1 centimeters wide, separation cartridge 100, in an exemplary embodiment, is approximately 6.4 centimeters to 19.1 centimeters wide. Alternatively, separation cartridge 100 may be any suitable width depending on the particular design of hood 80.

In an exemplary embodiment, as shown in FIG. 10, separation cartridge 100 includes a front portion 158 and a back portion 160. Front portion 158 is configured to receive the exhaust. Back portion 160 is where the exhaust exits separation cartridge 100 and enters exhaust chamber 86. Separation cartridge 100 is configured so that back portion 160 protrudes from a plane 156 defined by upper and lower railings 102 and 104. In another embodiment, separation cartridge 100 may be configured so that front portion 158 protrudes from plane 156. Generally, front portion 158 comprises one separation medium and back portion 160 comprises another separation medium. In an exemplary embodiment, as shown in FIG. 10, back portion 160 comprises packed bed 108, which protrudes rearward from plane 156. In other embodiments, front portion 158 may include packed bed 108 and may be configured to be between railings 102 and 104 or protrude forward in front of railings 102 and 104. There are, of course, a number of various ways in which separation cartridge 100 may be configured so that either front portion 158 or back portion 160 protrudes from plane 156.

Separation cartridge 100 as shown in FIGS. 8–10 may include any of a number of alternative features and configurations as discussed previously or that otherwise may be desirable. For example, packed bed 108 shown in FIGS. 8–10 is flat. However, packed bed 108 may also be pleated.

Referring to FIG. 11, a cross-sectional top view of another exemplary embodiment of separation cartridge 100 is shown. In this embodiment, packed bed 108 is configured so that the pleats are positioned partially inside exit openings 120 of baffle 106. This configuration provides a number of advantages such as conserving space.

Figure 12:
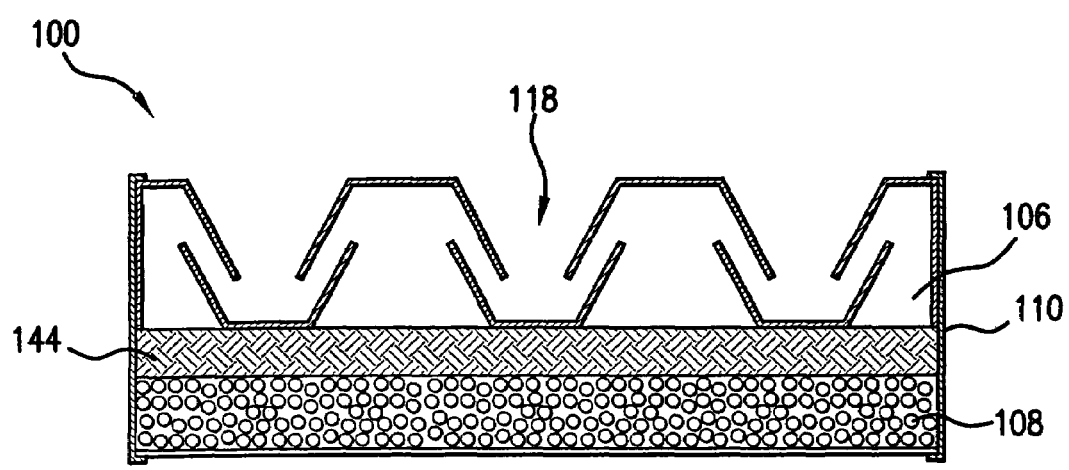
FIG. 12 shows a cross-sectional top view of a separation cartridge according to another exemplary embodiment.
Figure 13:
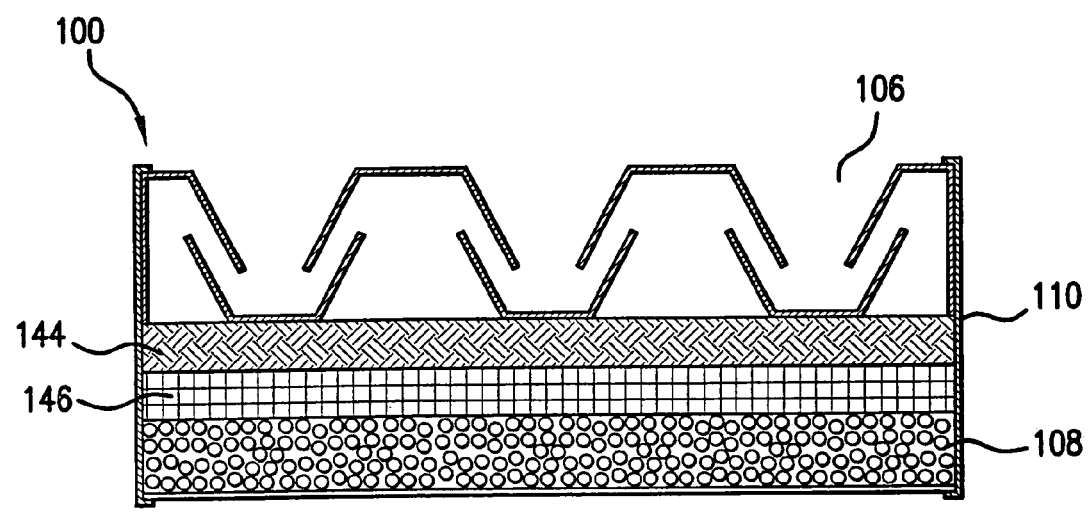
FIG. 13 shows a cross-sectional top view of a separation cartridge according to another exemplary embodiment.

Referring to FIGS. 12 and 13, a cross-sectional top view of further exemplary embodiments of separation cartridge 100 are shown. In these embodiments, separation cartridge 100 includes a plurality of separation mediums arranged in various configurations. In an exemplary embodiment, shown in FIG. 12, separation cartridge 100 includes baffle 106, packed bed 108, and a mesh filter 144 positioned between baffle 106 and packed bed 108. Of course, FIG. 12 is only one embodiment and in other embodiments mesh filter 144 may be positioned in any of a number of positions. For example, mesh filter 144 may be placed in front of baffle 106 to provide an initial filter for air entering separation cartridge 100. Mesh filter 144 may also be positioned behind packed bed 108.

In another exemplary embodiment, shown in FIG. 13, multiple mesh filters may be used to separate entrained substances from a gas or air stream. In this embodiment, separation cartridge 100 includes baffle 106, packed bed 108, mesh filter 144, and mesh filter 146. Mesh filter 146 may be the same as mesh filter 144. However, another configuration for separation cartridge 100 is where mesh filter 144 is configured to filter out larger substances and mesh filter 146 is configured to filter out substances that are slightly or significantly smaller than those filtered out by mesh filter 144.

Mesh filters 144 and 146, shown in FIG. 13, are placed one right after the other. However, in other embodiments, mesh filters 144 and 146 may be positioned separate from one another. For example, mesh filter 144 and 146 may be positioned on opposing sides of baffle 106 or on opposing sides of packed bed 108.

Mesh filters 144 and 146 may be disposable or reusable. Mesh filters 144 and 146 are typically configured to be separate from baffle 106 and packed bed 108 so that when separation cartridge 100 is disassembled mesh filter 144 or 146 may be removed. Mesh filters 144 and 146 may be pleated or, as shown in FIGS. 12 and 13, flat.

Mesh filters 144 and 146 may be any of a number of different filters. For example, mesh filters 144 and 146 may include metal fibers such as aluminum, stainless steel, etc. or other organic or inorganic fibers such as ceramic. In addition, mesh filters 144 and 146 may be configured in a honeycomb pattern, overlaid layers of material, etc. The particular configuration of mesh filters 144 and 146 may depend on its position. For example, if mesh filter 144 is positioned in front of baffle 106, then it may be desirous to use a coarse filter to filter out larger substances. However, if mesh filter 144 is positioned after baffle 106, then it may be desirable to use a finer filter to filter out the substances that pass through baffle 106.

In further exemplary embodiments, multiple mesh filters and/or other separation mediums such as additional baffles, packed beds, etc. may be used in conjunction with or as a replacement for baffle 106, packed bed 108, mesh filter 144, etc. FIG. 25 shows a cross-sectional top view of an exemplary embodiment of separation cartridge 100 according to one of these embodiments. Separation cartridge 100, shown in FIG. 25 includes baffle 106, packed bed 108a, mesh filter 146, and packed bed 108b positioned in that order. Of course, other configurations of separation mediums may be used as well. Also, it should be understood, that certain configurations may be more or less desirable based on the applicable codes and regulations governing the particular use of disclosed separation mediums, cartridges, and apparatuses.

Figure 14:
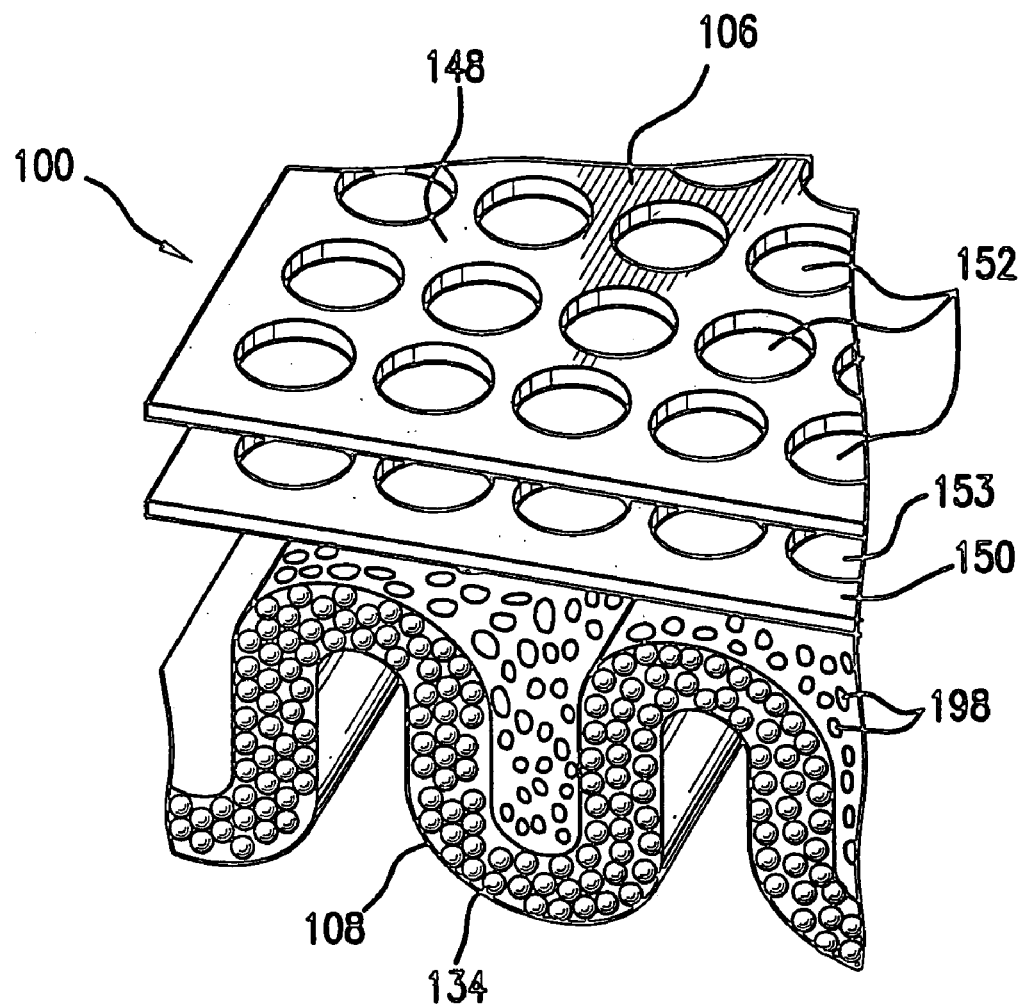
FIG. 14 shows a cross-sectional perspective view of a separation cartridge according to another exemplary embodiment.

Referring to FIG. 14, a cross-sectional perspective view of another exemplary embodiment of separation cartridge 100 is shown. Separation cartridge 100 includes baffle 106 and packed bed 108, but, of course, may also include other separation mediums in any desirable configuration. In an exemplary embodiment, baffle 106 comprises a first plate 148 including a plurality of openings 152 and a second plate 150 including a plurality of openings 153. First and second plates 148 and 150 and are spaced apart perforated plates. The use of perforated plates may be advantageous in that the plates may be stamped in simple processes to form openings 152 and 153. In general, plates 148 and 150 are designed to divide the exhaust into multiple micro flows. As the exhaust flows through plates 148 and 150, entrained substances such as grease collides with plates 148 and 150 and drain into a grease trough in a manner analogous to that shown in FIG. 1

Figure 21:
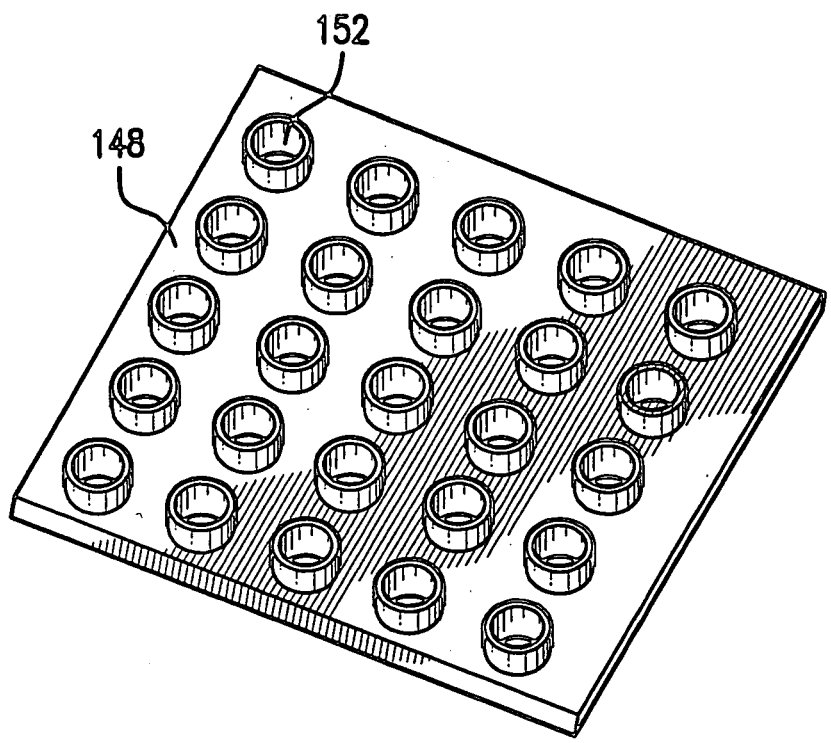
FIG. 21 shows a perspective view of a plate for a baffle according to another exemplary embodiment.
Figure 22:
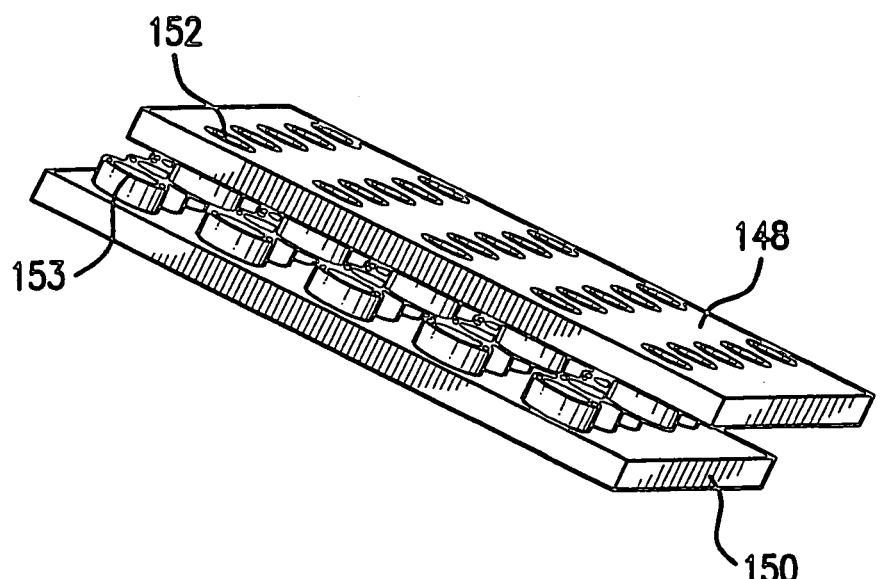
FIG. 22 shows a perspective view of a baffle according to another exemplary embodiment.
Figure 23A:
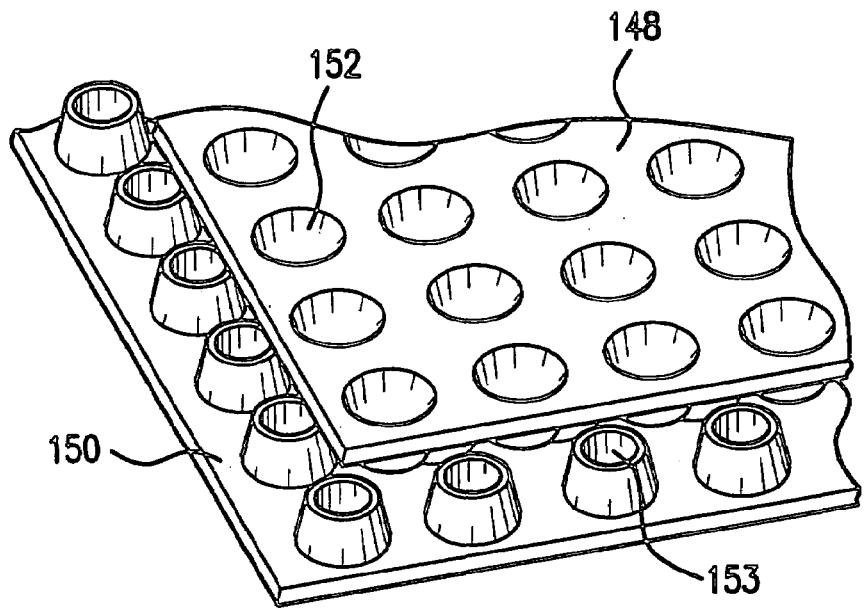
FIG. 23(a) shows a perspective view of a baffle according to another exemplary embodiment.
Figure 23B:
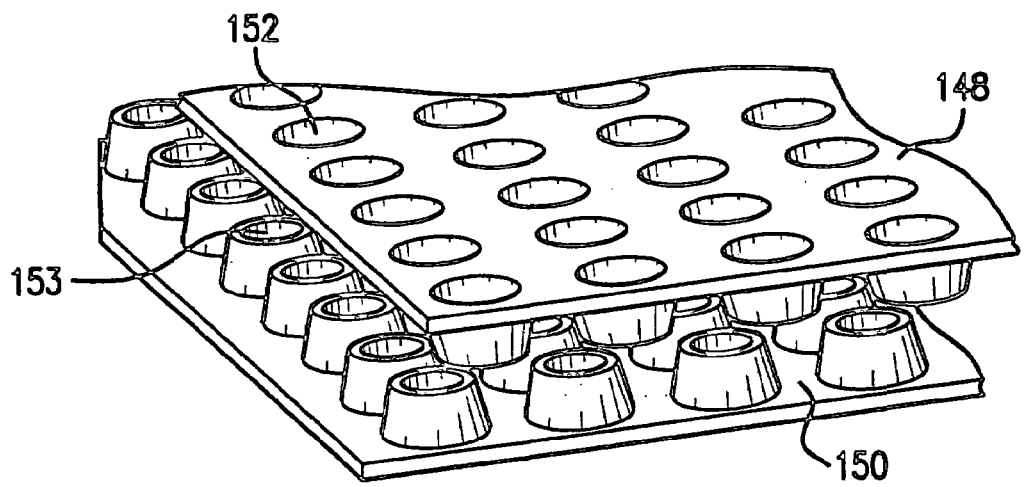
FIG. 23(b) shows a perspective view of a baffle according to another exemplary embodiment.
Figure 24A:
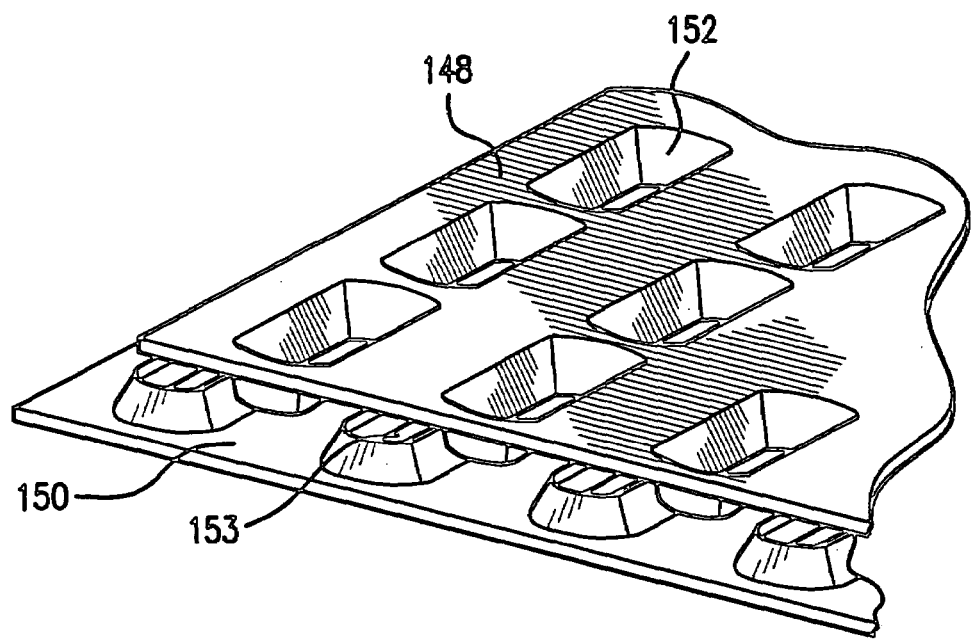
FIG. 24(a) shows a perspective view of a baffle according to another exemplary embodiment.
Figure 24B:
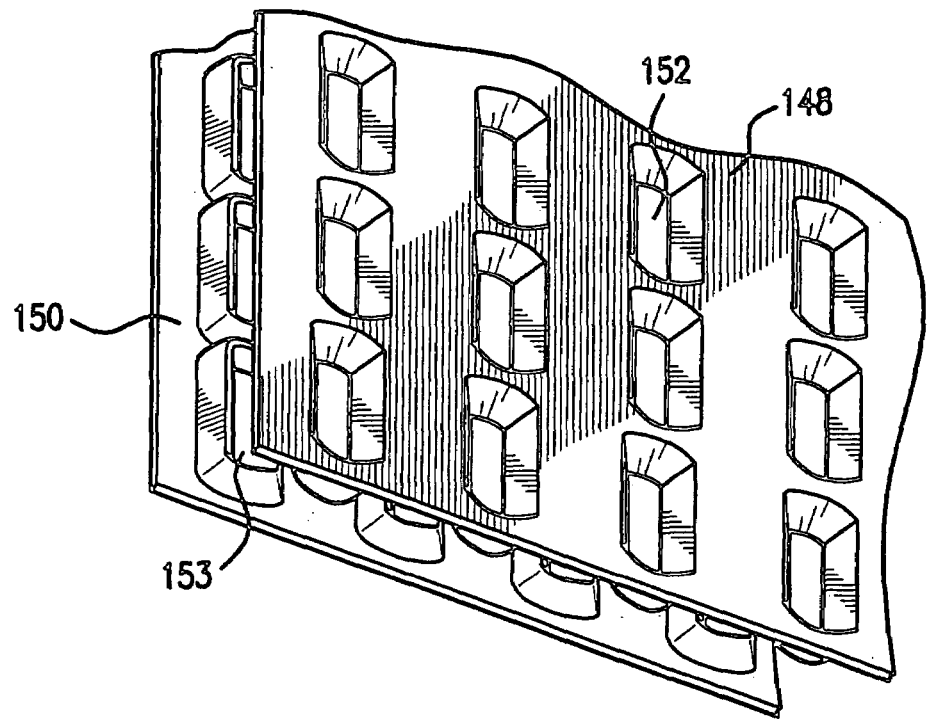
FIG. 24(b) shows a perspective view of a baffle according to another exemplary embodiment.

Openings 152 and 153 may be configured in a variety of ways as shown in FIGS. 14–15 and 21–24. In some embodiments, openings 152 and 153 are round, as shown in FIGS. 14 and 21–23, or rectangular, as shown in FIGS. 15 and 24. Of course, other shapes may be used that are multilateral, round, half moon, slot, oblong, etc. Also, openings 152 and 153 may be straight, as shown in FIG. 14; round and collared, as shown in FIGS. 21 and 22; tapered, collared and round, as shown in FIG. 23; tapered, collared, and generally rectangular, as shown in FIG. 24; or, in any suitable shape or combination of shapes (e.g., frustoconical, etc.). Openings 152 and 153 may be formed into louvers to direct the air more efficiently and improve impaction of the grease on plates 148 and 150.

Advantageously, baffle 106, shown in FIG. 14, may provide a low pressure drop compared to other baffle designs. The pressure drop is a function of the open area of plates 148 and 150, the offset percentage of openings 152 and 153, and the velocity of the exhaust. In general, it is desirable to provide a high open area along with a high offset percentage to increase the efficiency of baffle 106 while still maintaining an acceptable pressure drop. The open area refers to the percentage of the area of plate 148 or 150 that is open for exhaust to pass through. The offset percentage refers to the alignment of openings 152 and 153 of plates 148 and 150. In particular, the offset percentage generally refers to the area of openings 152 (in other words, the area of the openings on the plate that the fluid stream initially passes through) that does not overlap with openings 153 (in other words, the area of the openings of the plate or plates that the fluid passes through after passing through the initial plate) expressed as a percentage of the total area of openings 152. Openings 152 and 153 overlap if exhaust passing through one set of openings is capable of passing through the next set of openings without being deflected. For example, in a separation apparatus that comprises two plates, 100% offset means that there is no overlap between the openings in the first plate and the openings in the second plate. Likewise, 50% offset means that 50% of the area of the openings in the first plate overlap with the openings in the second plate. In a separation apparatus that comprises three plates, the offset percentage may be used to refer to two adjacent plates or the combination of all three plates. The former situation is explained above. In the latter situation, the offset percentage refers to the area of the openings in the first plate through which the fluid passes that does not overlap with both the area of the openings in the second plate and the area of the openings in the third plate. In general, it is desirable to provide an offset percentage of approximately 100% so that all of the exhaust is deflected as it travels through plates 148 and 150.

In an exemplary embodiment, as shown in FIG. 14, plates 148 and 150 have substantially round openings 152 and 153 and have an open area of not more than approximately 40%, or, desirably, not more than approximately 30% with an offset percentage of approximately 100%, 90%, 80%, or 70%. In another exemplary embodiment as shown in FIG. 14, plates 148 and 150 have substantially round openings 152 and 153 and have an open area of approximately 10% to approximately 50%, or, desirably, of approximately 20% to approximately 40% coupled with an offset percentage of not less than approximately 40%, or desirably, not less than approximately 60%, or, suitably, not less than approximately 80%.

In an exemplary embodiment, as shown in FIG. 15, plates 148 and 150 have substantially rectangular openings 152 and 153 and have an open area of not more than approximately 60%, or, desirably, not more than approximately 50%, or desirably, not more than approximately 40% with an offset percentage of approximately 100%, 90%, 80%, or 70%. In another exemplary embodiment, as shown in FIG. 15, plates 148 and 150 have substantially rectangular openings 152 and 153 and have an open area of approximately 20% to approximately 60%, or, desirably, of approximately 30% to approximately 50% coupled with an offset percentage of not less than approximately 40%, or desirably, not less than approximately 60%, or, suitably, not less than approximately 80%.

Referring to FIGS. 14–15 and 21–24, baffle 106 including plates 148 and 150 may be configured in a number of ways. In an exemplary embodiment, as shown in FIG. 22, plates 148 and 150 are in an opposed relationship so that the offset percentage of openings 152 and 153 is approximately 100%. Also, the use of collared openings may enhance the deflection of the exhaust. In an exemplary embodiment, the collars on opposing plates 148 and 150 extend beyond one another so that the exhaust must be deflected at least a total of one hundred and eighty degrees for the exhaust to pass through plates 148 and 150. FIGS. 23(a) and (b) is similar to FIG. 22 except that in this embodiment, openings 152 and 153 are tapered.

In another exemplary embodiment, as shown in FIG. 24, openings 152 and 153 of plates 148 and 150, respectively, are generally rectangular, collared, and tapered. This configuration may be desirable because the user of rectangular openings typically allows for a greater open area at a given offset percentage than the use of substantially round openings.

Figure 31:
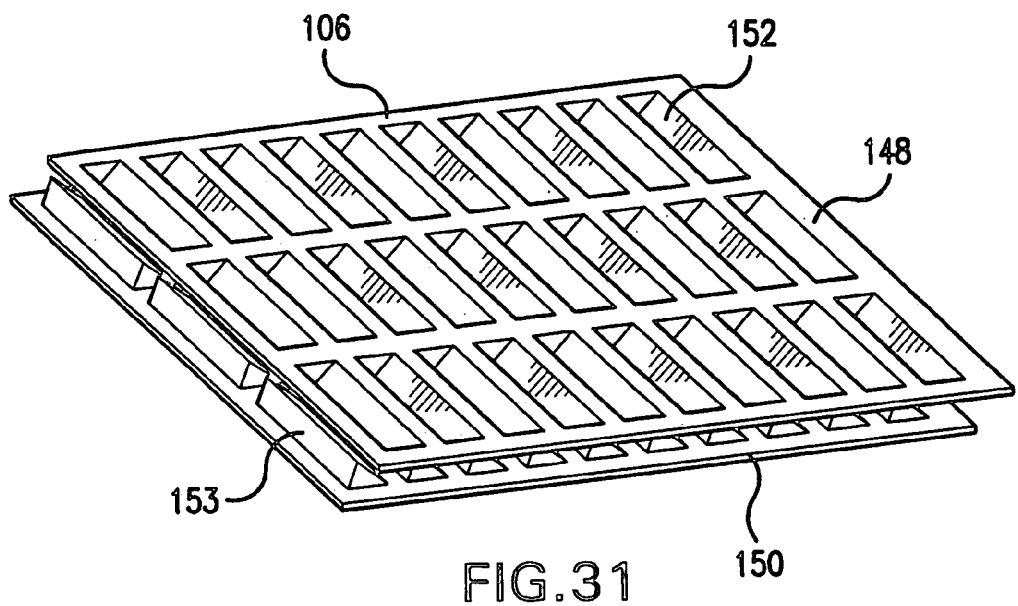
FIG. 31 shows a perspective view of a baffle according to another exemplary embodiment.
Figure 32:
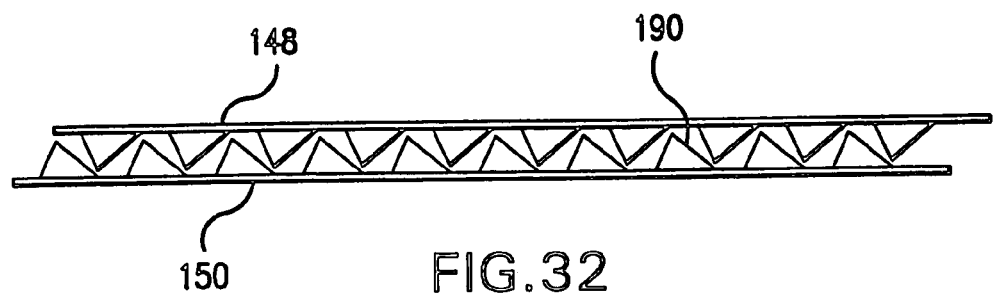
FIG. 32 shows a side view of a baffle according to the embodiment shown in FIG. 31.

In another exemplary embodiment, as shown in FIGS. 31 and 32, openings 152 and 153 of plates 148 and 150, respectively, are louvered. Openings 152 and 153 are configured so that plates 148 and 150 have an offset percentage of 100%. This is done by positioning plates 148 and 150 so that the louvers face each other in an opposing relationship with openings 152 and 153 being opposite the generally sloped surface 190 of the opposing louver. In this manner, the exhaust passing through openings 152 of plate 148 is deflected by surface 190 before passing through openings 153 of plate 150.

Figure 18:
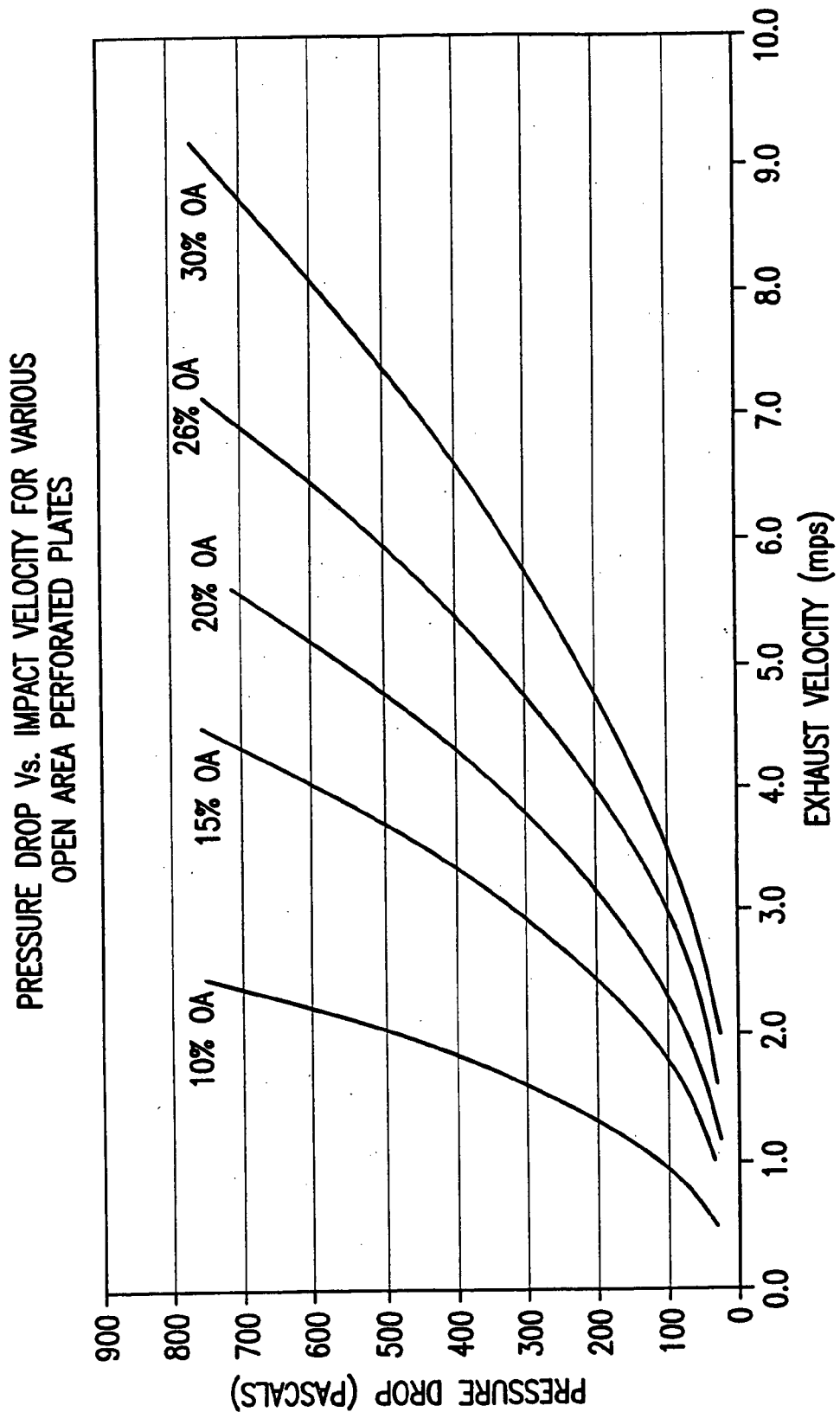
FIG. 18 shows a graph of pressure drop in pascals versus exhaust velocity in meters per second.

FIG. 18 is a graph showing the pressure drop in pascals versus the exhaust velocity in meters per second for plates 148 and 150 having various open areas. The graph shows that as percent open area increases, the pressure drop at a given velocity generally decreases. For example, a plate having an open area of 20% at a velocity of 5 meters per second has a pressure drop of approximately 575 pascals. However, a plate having an open area of 30% at a velocity of 5 meters per second has a pressure drop of approximately 225 pascals. Also, the graph shows that as the velocity increases, the pressure drop for a plate having a given open area also increases. For example, a plate having an open area of 30% has a pressure drop of approximately 225 pascals at a velocity of 5 meters per second and has a pressure drop of approximately 600 pascals at a velocity of 8 meters per second.

In addition to providing a low pressure drop, plates 148 and 150 may occupy less space then other designs. In one embodiment, plates 148 and 150 are configured to be spaced apart approximately 0.025 centimeters to approximately 4.8 centimeters, and, desirably, approximately 0.64 centimeters to approximately 2.6 centimeters. Of course, plates 148 and 150 may be spaced apart at widths more or less than those disclosed depending on the particular design of separation cartridge 100 and the ventilation system that it is used with.

Although plates 148 and 150 are shown as part of separation cartridge 100, they may also be configured in a number of other ways. For example, in one embodiment a separation system may include plates 148 and 150 positioned in hood 80 at a distance from any other separation medium such as a baffle, mesh filter, or packed bed. In one embodiment, plates 148 and 150 may be built into hood 80 so that removing the separation apparatus would require the removal or substantial disassembly of hood 80.

In another exemplary embodiment, a separation system such as a system that comprises hood 80 may be configured to include a single plate 148 alone or in combination with other separation mediums. For example, in an exemplary embodiment, plate 148 may be configured to be placed in front of baffle 106 as shown in FIG. 4. Of course, other embodiments and various combinations of separation mediums may be used as desirable.

In another exemplary embodiment, baffle 106 as shown in FIGS. 14–15 and 21–24 may include more than two plates 148 and 150. In one embodiment, baffle 106 may include three plates, each of which has an offset percentage of no less than approximately 50% in comparison to an adjacent plate and an overall offset percentage for baffle 106 of not less than approximately 90% or, desirably, not less than approximately 100%. Of course, other configurations may also be used such as four or more plates, as well as any of the open areas, offset percentages, configurations of openings, etc., described above in conjunction with FIGS. 14–15 and 21–24.

EXAMPLES

The following examples are presented to illustrate the teachings and concepts described herein and to assist one of ordinary skill in making and using the same. The examples are not intended in any way to otherwise limit the scope of the invention.

Example 1

Figure 30:
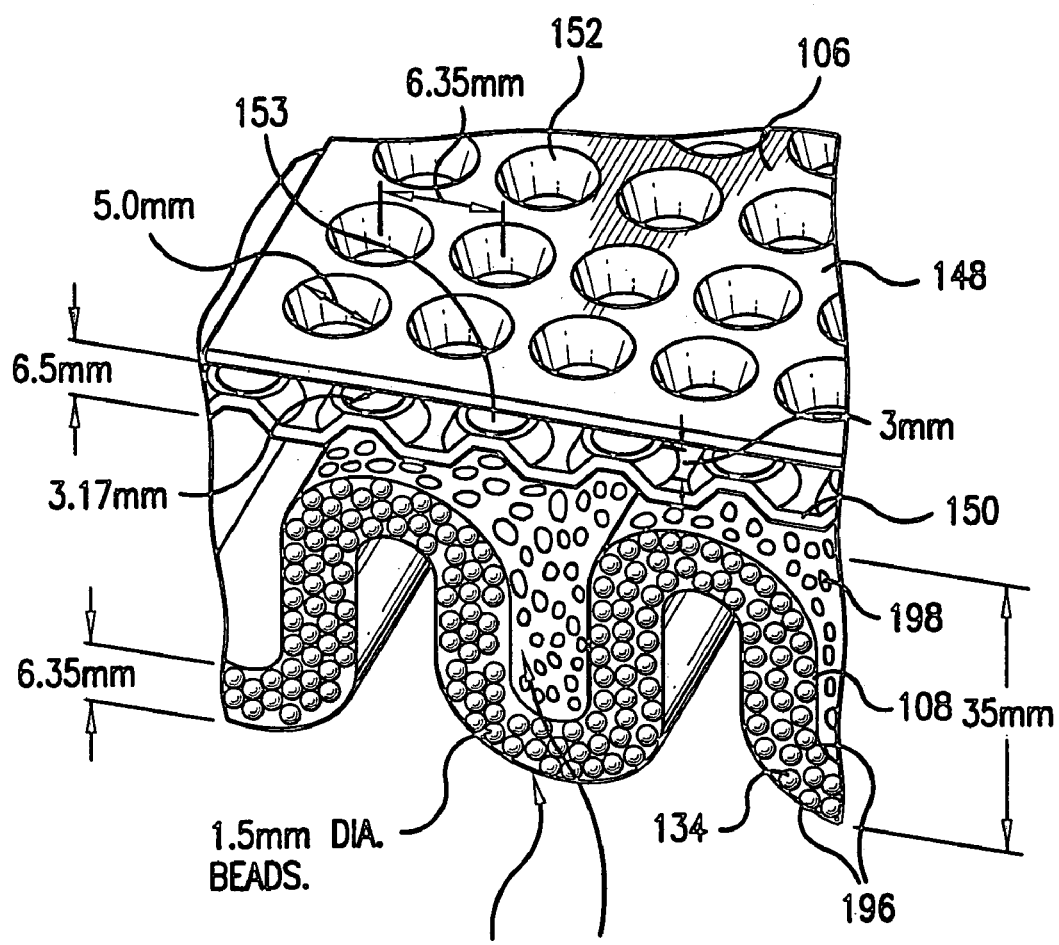
FIG. 30 shows a cross-sectional perspective view of a separation cartridge according to another exemplary embodiment.

Referring to FIG. 30, a cross-sectional side view of an exemplary embodiment of separation cartridge 100 is shown. Separation cartridge 100 includes baffle 106 and packed bed 108. Baffle 106 includes plates 148 and 150, which are configured to include substantially round, tapered, collared openings 152 and 153. Openings 152 and 153 are approximately 5 millimeters in diameter at their widest and 3.17 millimeters in diameter at their narrowest. Openings 152 in plate 148 are spaced apart approximately 6.35 millimeters (measured from the center of one opening 152 to the center of an adjacent opening 152). Likewise, openings 153 in plate 150 are spaced apart approximately 6.35 millimeters (measured from the center of one opening to the center of an adjacent opening). Plates 148 and 150 have an open area of approximately 20%. The collars surrounding each opening 152 and 153 extend substantially outward from plates 148 and 150 in a tapered manner approximately 3 millimeters. Plates 148 and 150 are positioned so that the collars on each plate protrude outwardly toward each other. The offset percentage for plates 148 and 150 is 100%. The distance between plates 148 and 150 is approximately 6.5 millimeters.

Packed bed 108 is configured to use a porous inorganic media 134 that is substantially spherical and has a diameter of approximately 1.5 millimeters. The pore size of each individual media particle is approximately 0.1 microns to approximately 10 microns. Packed bed 108 is pleated with an area multiplier of approximately 2. Also, the bed depth of packed bed 108 is 6.35 millimeters and the width of packed bed 108 is 35 millimeters. The perforated plates 196 used to make packed bed 108 are 0.5 millimeters thick and openings 198 are 0.83 millimeters in diameter. Also, perforated plates 196 have an open area of approximately 25%.

Example 2

Figure 16:
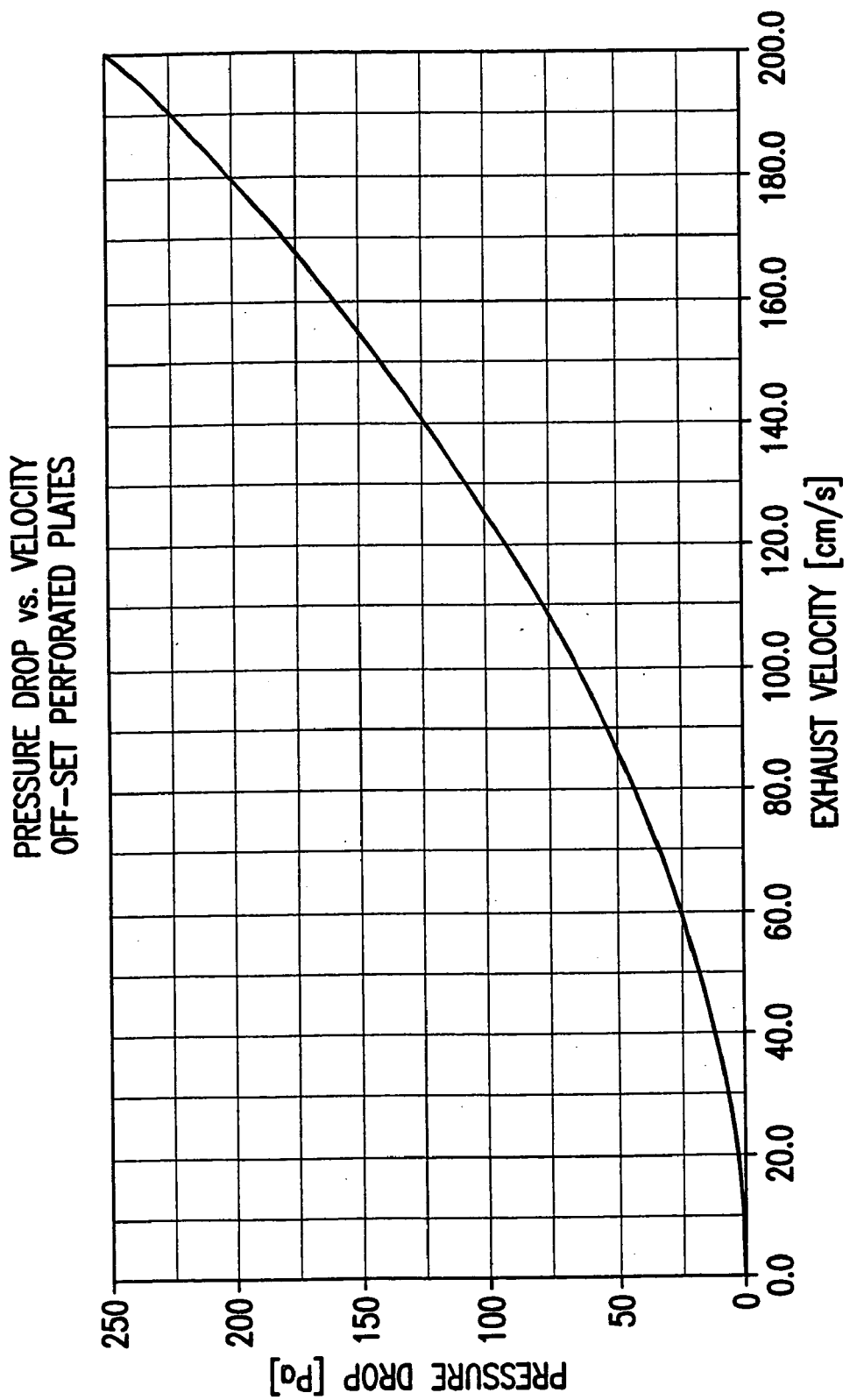
FIG. 16 shows a graph pressure drop in pascals versus exhaust velocity in centimeters per second.

An exemplary embodiment of plates 148 and 150 is tested to determine the pressure drop. In this embodiment, plates 148 and 150 are spaced apart approximately 0.625 centimeters. Plates 148 and 150 have approximately 0.238 centimeter straight holes and 20% open area and are similar to plates 148 and 150 shown in FIG. 14. FIG. 16 shows a graph of pressure drop in pascals versus the exhaust velocity in centimeters per second for plates 148 and 150 described in this example. A typical exhaust velocity for a hood is approximately 200 centimeters per second. As shown in FIG. 16, the pressure drop ranges from approximately 40 pascals at 80 cm/s to approximately 200 pascals at 180 cm/s. The pressure drop is not linear but is instead a slightly concave curve.

Example 3

Figure 17:
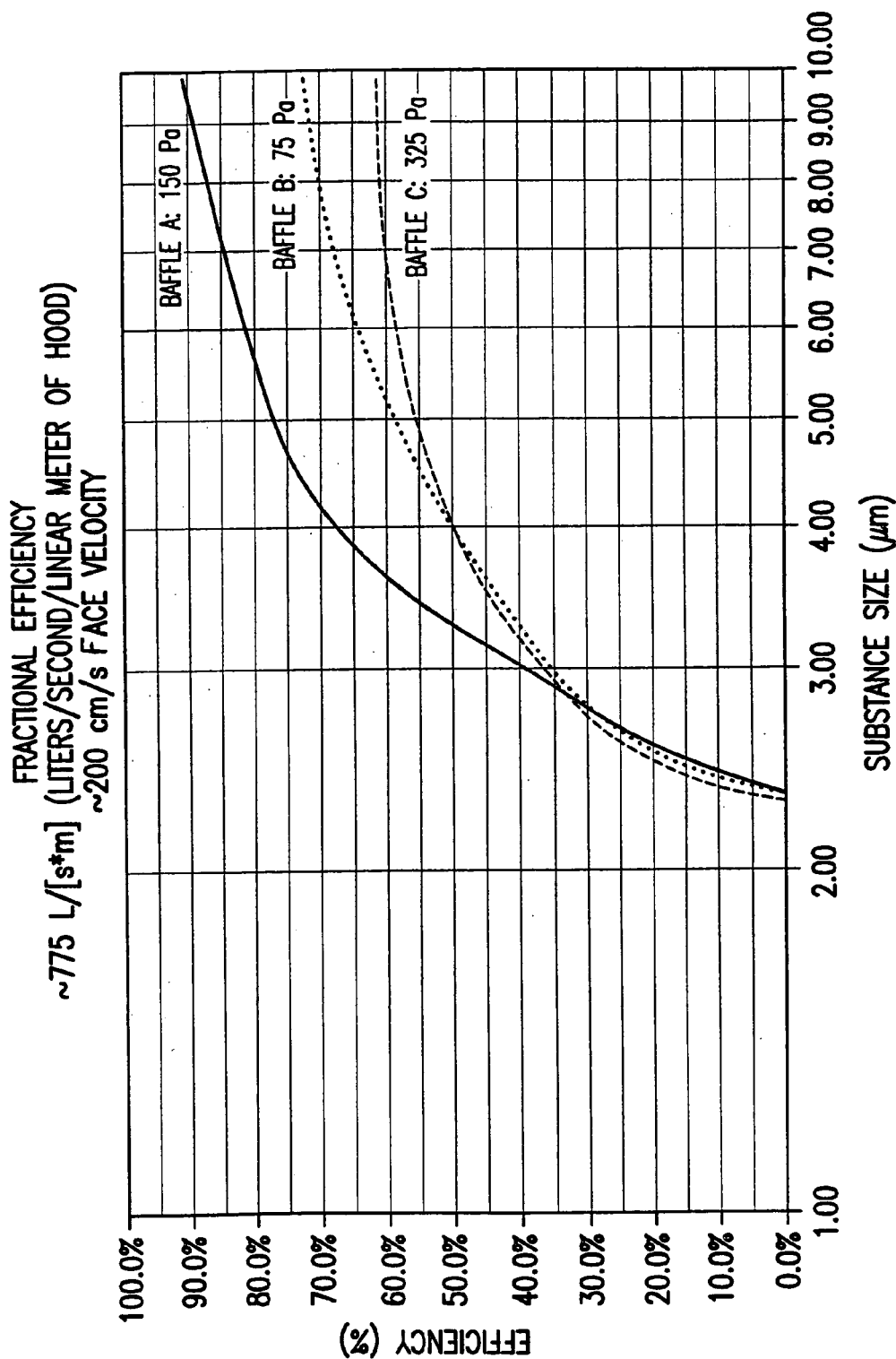
FIG. 17 shows a graph of separation efficiency (% of substance separated from a gas stream) for three exemplary embodiments of a baffle versus substance size in microns.

Two exemplary embodiments of baffle 106, both of which include plates 148 and 150, and a baffle similar to that shown in FIG. 5 are tested to determine the separation efficiency of each one. FIG. 17 is a graph of the results of the test. The baffle that is similar to FIG. 5 has a pressure drop that is approximately 325 pascals and is referred to on the accompanying graph as Baffle C. The exhaust flow is approximately 775 L/(s·m) (i.e., liters per (second·linear meter of hood)). The face velocity is approximately 200 centimeters per second.

The first exemplary embodiment of baffle 106 is referred to as Baffle A in FIG. 17. Baffle A includes two perforated plates that are spaced apart approximately 0.625 centimeters. Each of the perforated plates has an open area of approximately 23%. Also, the openings in the plates are substantially round with a diameter of approximately 0.24 centimeters. The spacing of the openings is substantially uniform and is approximately 0.48 centimeters from the center of one opening to the center of an adjacent opening. Also, the pressure drop across this embodiment is approximately 150 pascals at a velocity of 200 centimeters per second.

The second exemplary embodiment of baffle 106 is referred to as Baffle B in FIG. 17. Baffle B includes two perforated plates that are spaced apart approximately 0.625 centimeters. Each of the perforated plates has an open area of approximately 26%. Also, the openings are substantially round with a diameter of approximately 0.08 centimeters. The spacing of the openings is substantially uniform and is approximately 0.16 centimeters from the center of one opening to the center of an adjacent opening. Also, the pressure drop across this embodiment is approximately 75 pascals at a velocity of 200 centimeters per second.

The graph shows that for substances between three and ten microns in size, Baffle A is substantially more efficient than Baffle B, which is more efficient than Baffle C. Specifically, for substances that are approximately 8 microns in size; Baffle A removes approximately 87%; Baffle B removes approximately 68%; and Baffle C removes approximately 62%.

Example 4

Figure 27:
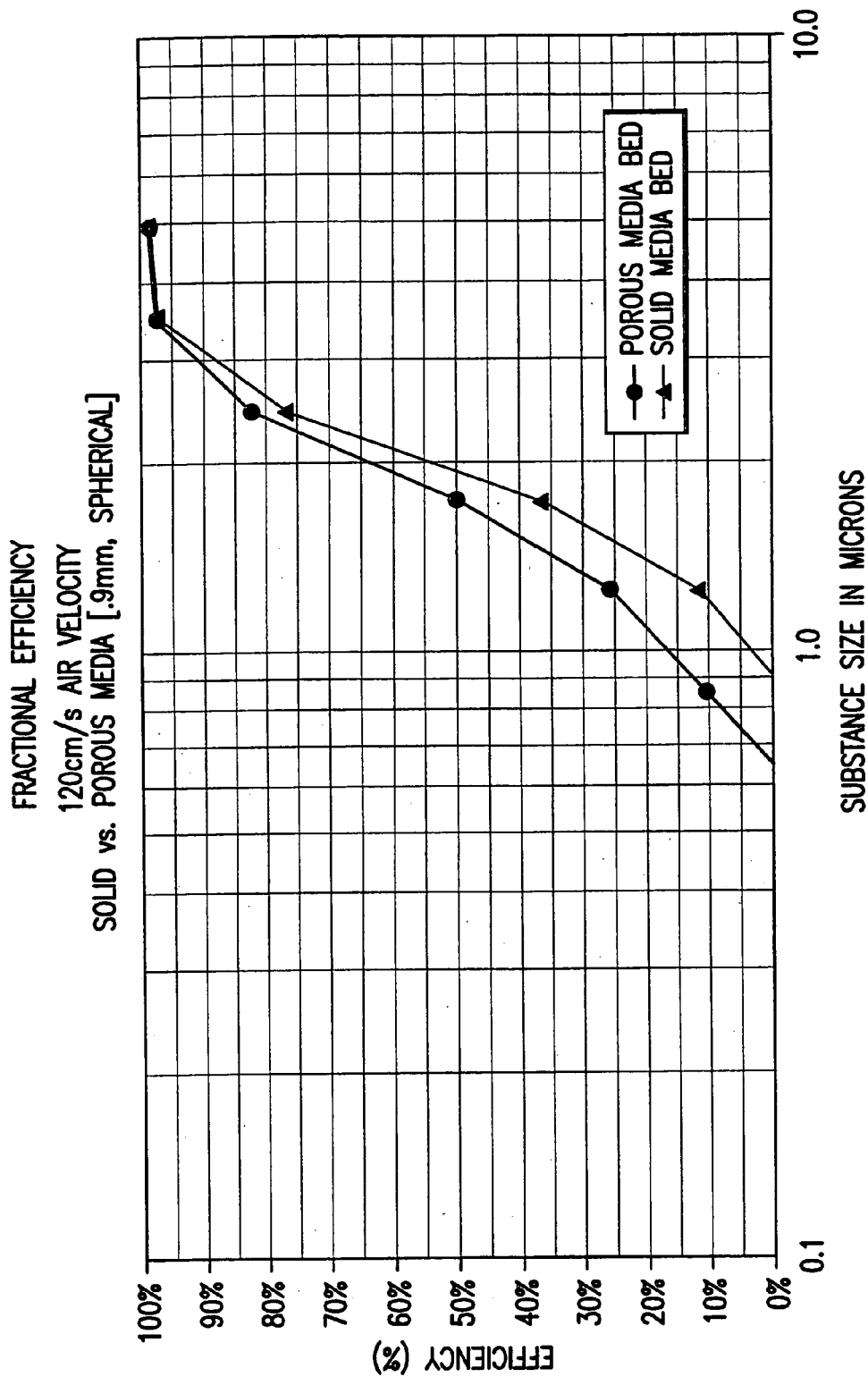
FIG. 27 is a graph of the separation efficiency for porous and solid media versus substance size in microns.

Referring to FIG. 27, a graph is shown of the separation efficiency of an exemplary embodiment of packed bed 108, that includes porous media, which is referred to in the graph as "Porous Media Bed" and another exemplary embodiment of packed bed 108 that includes solid media, which is referred to in the graph as "Solid Media Bed." The characteristics of both the Porous Media Bed and the Solid Media Bed are as follows. The bed depth of both beds is approximately 0.75 centimeters. The size of the porous and solid media are substantially spherical in shape and have a diameter of approximately 0.9 millimeters to approximately 1.0 millimeters. The velocity of the air flowing into the beds is approximately 120 centimeters per second.

As shown in the graph, the separation efficiency of porous media versus solid media for a packed bed is similar with the packed bed being somewhat more efficient. For substances smaller than one micron, the porous media is more efficient than the solid media (e.g., for 0.9 micron substances, the porous media removes approximately 12.5% and the solid media removes approximately 0%. However, for approximately 3.3 micron substances, both the solid and porous media are approximately 98% efficient.

Example 5

Figure 28:
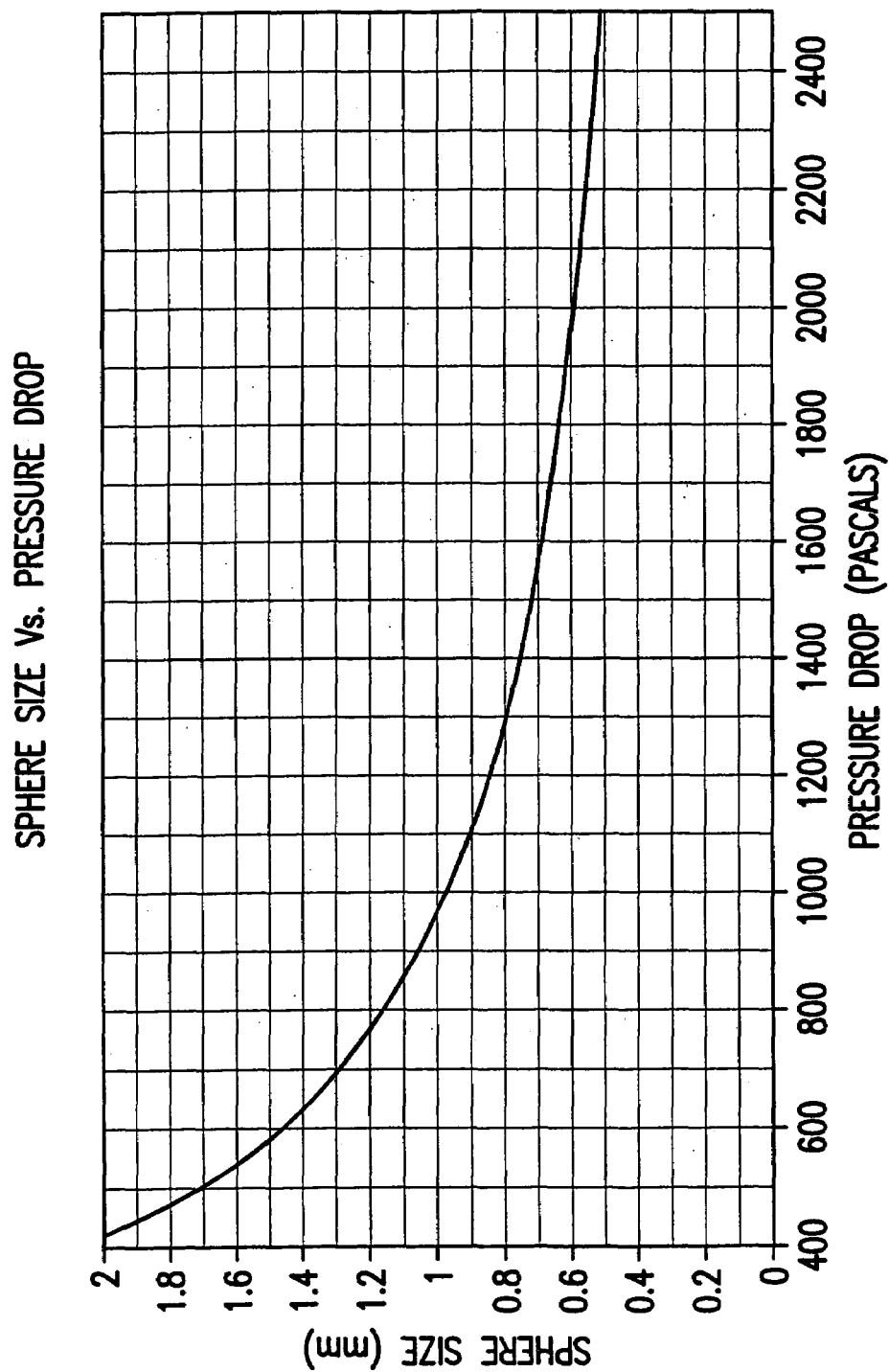
FIG. 28 is a graph of the media sphere size versus the pressure drop for an exemplary embodiment of a packed bed.

Referring to FIG. 28, a graph of the media size versus pressure drop is shown for an exemplary embodiment of packed bed 108. In this example, packed bed 108 is approximately 2.54 centimeters wide and the velocity of the exhaust is approximately 3.7 meters per second. The media is substantially spherical.

As shown in the graph, the general trend is that for larger media sizes the pressure drop is smaller and as the media size decreases the pressure drop increases. The Y axis of the graph shows the media size in millimeters in ascending order. The X axis of the graph shows the pressure drop in pascals beginning with four hundred pascals as the origin. The shape of the curve shown in the graph is concave with the high point corresponding to the largest media size and smallest pressure drop and the low point corresponding to the smallest media size and highest pressure drop. For example, for a media size of approximately 2 millimeters, the pressure drop is approximately 425 pascals. Also, for a media size of approximately 1.2 millimeters, the pressure drop is approximately 790 pascals. For a media size of approximately 0.7 millimeters, the pressure drop is approximately 1600 pascals.

Example 6

Figure 29:
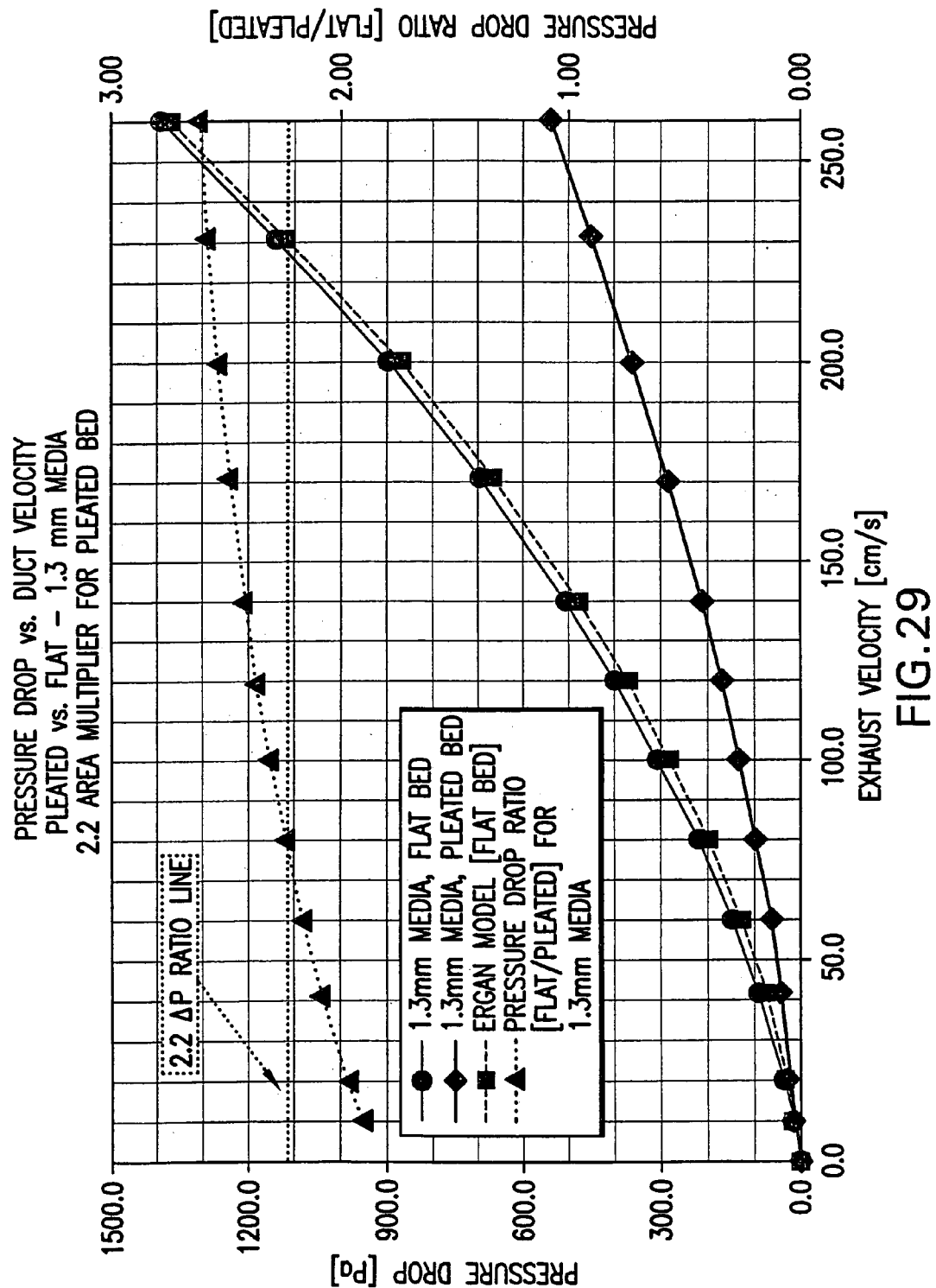
FIG. 29 is a graph of the pressure drop in pascals versus the exhaust velocity in centimeters per second for an exemplary embodiment of a pleated packed bed and a flat packed bed.

FIG. 29 shows a graph of the pressure drop in pascals versus the exhaust velocity in centimeters per second for an exemplary embodiment of packed bed 108 that is flat and an exemplary embodiment of packed bed 108 that is pleated. The pleated bed has a 2.2 multiplier versus the flat bed. Also, both embodiments use 1.3 millimeter substantially spherical media. Also, shown in the graph is the pressure drop ratio of the flat bed over the pleated bed. The pressure drop ratio is the pressure drop across the flat bed divided by the pressure drop across the pleated bed. As shown in the graph, the pressure drop across the flat bed for a given exhaust velocity is greater than the pressure drop across a pleated bed for the same exhaust velocity. This is because the media velocity (i.e., the velocity of the air as it passes through the media as opposed to the face velocity) is substantially different for a packed bed versus a pleated bed. The media velocity of the exhaust through the flat bed is greater than that of the pleated bed because there is much less area for air to flow through in a flat bed.

Example 7

An exemplary embodiment of a separation cartridge 100 may be made using the following procedure. Initially, packed bed 108 is formed using two perforated sheets of stainless steel. The openings are 0.635 centimeter squares and each sheet is approximately 50% open. Each sheet is formed into rectangular frame shapes that when put together form a flat packed bed 108. In order to accomplish this, one of the frame shapes is configured to fit into the other frame shape. Aluminum wire cloth is cut to fit inside of each of the frame shapes. The aluminum mesh is fixed to the outer edge of the frame shapes to prevent packed bed 108 media from leaking out of the openings (i.e., to contain the media). Accordingly, the wire cloth is configured to have openings that are smaller than the size of the media. The next step is to pack one of the frame shapes with media such as porous or solid inorganic beads (e.g., ceramic beads). The frame shape is packed with enough beads that when the frame shapes are fit together the media is tightly packed. Thus, packed bed 108 is held together by the frame shapes in a tight unit.

The baffle 106 is formed by cutting thin gauge stainless steel sheet metal into flat rectangular shapes, which are then bent to form the deflectors. The ends of the deflectors are then spot welded to two other rectangular pieces of stainless steel sheet metal.

The baffle 106 and packed bed 108 are assembled into separation cartridge 100 as follows. Initially, four pieces of stainless steel sheet metal are cut to the appropriate size (i.e., the size necessary to form a relatively snug frame around baffle 106 and packed bed 108). The pieces of sheet metal are then formed into a U-shape. The separation cartridge is assembled by pop riveting baffle 106 and packed bed 108 to the four pieces. The four pieces of sheet metal when assembled form frame 110.

Example 8

Figure 19:
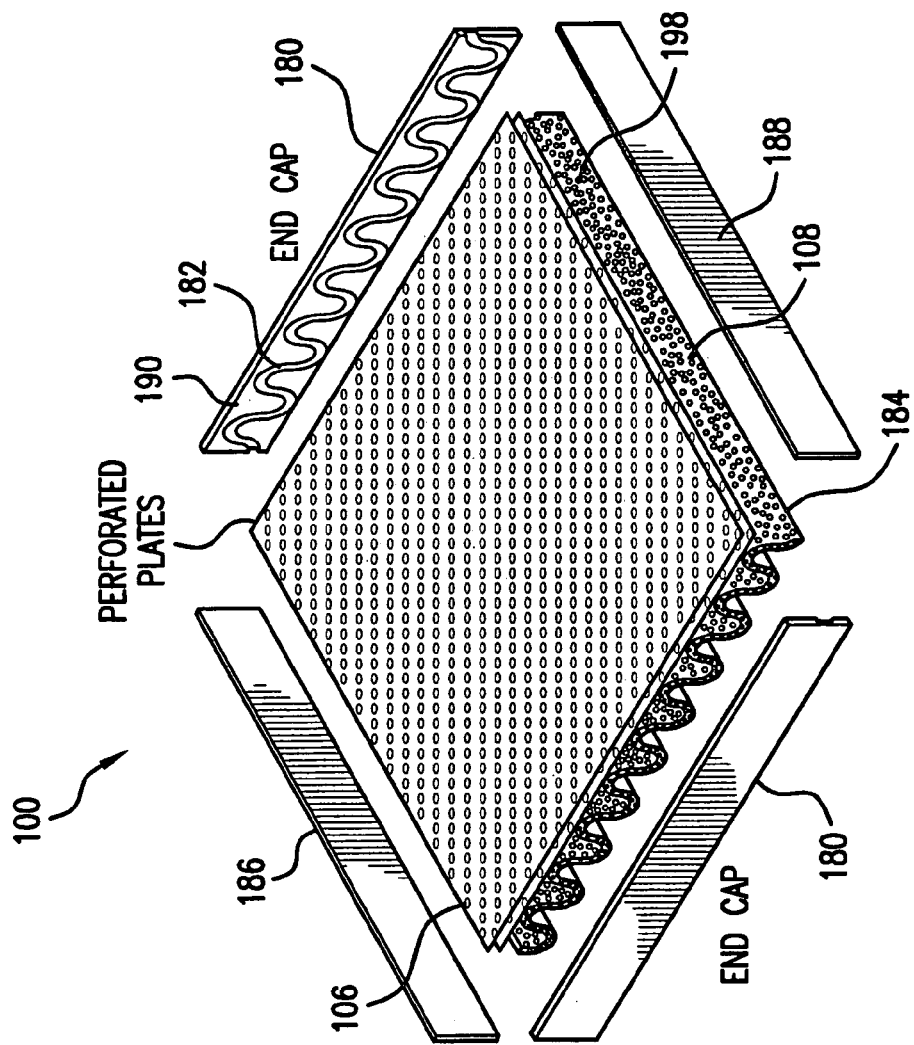
FIG. 19 shows an exploded perspective view of a separation cartridge according to another embodiment.

Another exemplary embodiment of separation cartridge 100 may be made, using the following procedure. Separation cartridge 100 includes baffle 106 and packed bed 108. Referring to FIG. 19, end caps 180 are machined out of flat 0.625 centimeter thick aluminum plate leaving trenches 182 to secure the pleated portion 184 of packed bed 108. Sides 186 and 188 are made out of flat 0.318 centimeter thick aluminum plate to hold end caps 180 together. Pleated portion, 184 is made using aluminum perforated sheet metal that is 0.0762 centimeters thick and has 0.476 centimeter openings 198 with the sheet being 50% open. Aluminum wire cloth is cut slightly larger than the aluminum sheet so that the wire cloth can be attached to the sheet by wrapping approximately 0.625 centimeters over each side. The aluminum wire cloth has openings that are smaller than the media in order to prevent the media from leaking out of openings 198. After the wire cloth is coupled to the perforated sheet, it was formed into a rounded pleated shape using a punch and die. The pleated portion is assembled by coupling it to end caps 180. Media in the form of porous inorganic beads (e.g., ceramic beads, etc.) is then poured into pleated portion 184 through a filler opening in one of end caps 180 until all of the space has been filled. Pleated portion 184 is tapped periodically during the filling process to ensure that the media is tightly settled. The filler opening is tapped so that a setscrew can be placed in the opening to seal it after the bed has been filled. The depth of the pleated portion 184 is approximately 0.635 centimeters.

Figure 33:
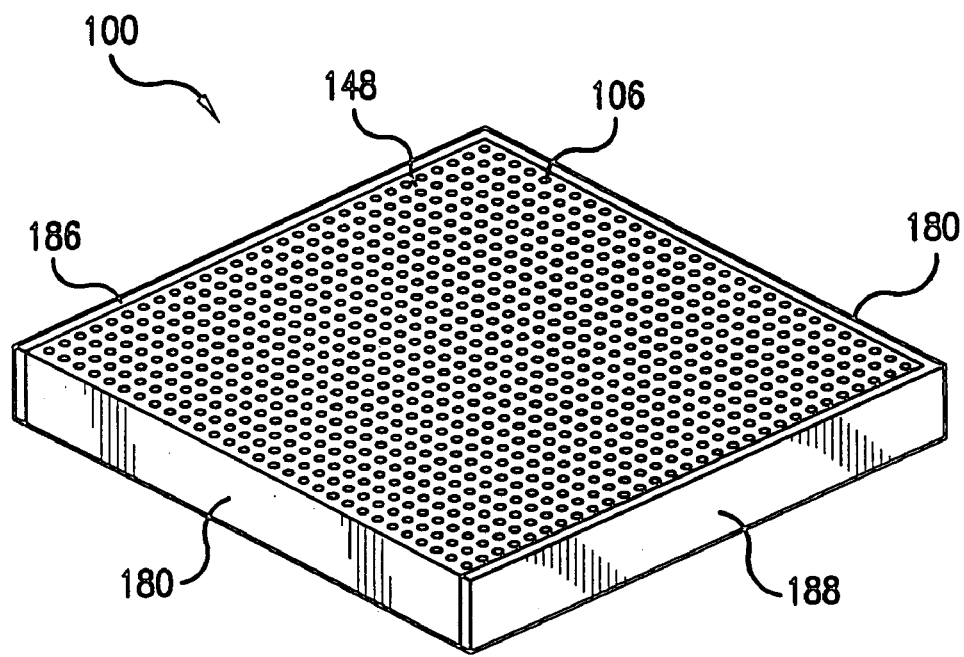
FIG. 33 shows a perspective view of a separation cartridge according to the embodiment of FIG. 19.

Baffle 106 is formed using plates 148 and 150. Plates 148 and 150 are formed by cutting two sheets of perforated sheet metal to the appropriate size. The plates are then slid into place on guide rails 190 in end caps 180. Sides 186 and 188 are then put in place to hold plates 148 and 150 in place. If plates 148 and 150 need to removed for cleaning or some other reason, sides 186 and 188 can be removed so that plates 148 and 150 slide out of end caps 180. FIG. 33 shows separation cartridge 100 after it has been assembled.

Example 9

Another exemplary embodiment of separation cartridge 100 may be made using the following procedure. In this embodiment, baffle 106 is a conventional commercially available baffle used in kitchen hoods. Conventional baffle 106 includes deflectors configured to deflect the air as it travels through the baffle, thus separating entrained substances such as grease from the gas or air stream. In this embodiment, packed bed 108 is coupled to baffle 106.

Packed bed 108 is made according to the procedure of Example 7. Baffle 106 and packed bed 108 are coupled together using two pieces of stainless steel sheet metal in a manner similar to that disclosed in relation to FIG. 9. Once the pieces of sheet metal are cut to the appropriate size, they are bent using a brake press. The pieces are then coupled to baffle 106 using pop rivets. Packed bed 108 slides between the two pieces of bent sheet metal in a removable manner. Thus, if packed bed 108 needs to be cleaned it may be easily removed from separation cartridge 100.

As utilized herein, the following terms shall include the following meanings in addition to and/or in conjunction with their plain and ordinary meaning to one of ordinary skill in the art to which the subject matter of this disclosure pertains. "Separation cartridge" means any module designed to be inserted into a larger apparatus that is designed to separate an entrained substance from a fluid stream. "Separation medium" means any device or apparatus that is configured to separate an entrained substance from a fluid stream. "Baffle" means any device or apparatus used to change the direction of flow or the velocity of a fluid.

As utilized herein, the terms "approximately," "about," "substantially," and similar terms are intended to have a broad meaning in harmony with the common and accepted usage by those of ordinary skill in the art to which the subject matter of this disclosure pertains. It should be understood by those of skill in the art that these terms are intended to allow a description of certain features described and claimed without restricting the scope of these features to the precise numerical ranges, etc. provided. Accordingly, these terms should be interpreted as indicating that insubstantial or inconsequential modifications or alterations of the subject matter described and claimed are considered to be within the scope of the invention as recited in the appended claims.

The construction and arrangement of the elements of the separation apparatus as shown in the embodiments is illustrative only. Although only a few embodiments of the present inventions have been described in detail in this disclosure, those of ordinary skill who review this disclosure will readily appreciate that many modifications are possible without materially departing from the novel teachings and advantages of the subject matter recited in the claims. Accordingly, all such modifications are intended to be included within the scope of the present invention as defined in the appended claims. The order or sequence of any process or method steps may be varied or re-sequenced according to alternative embodiments. Other substitutions, modifications, changes and omissions may be made in the design, operating conditions and arrangement of the embodiments without departing from the scope of the present invention as expressed in the appended claims.

What is claimed is:

1. A separation cartridge comprising:
   a baffle filter; and
   a packed bed of porous inorganic particles positioned adjacent to the baffle filter, the particles including at least one of an oxide ceramic material or a metal;
   wherein the baffle filter and the packed bed are coupled together in the cartridge; and
   wherein the cartridge is used to separate one or more entrained oleo substances from a gas stream in a kitchen hood system.

2. The separation cartridge of claim 1 wherein the packed bed is pleated.

3. The separation cartridge of claim 1 wherein the particles include particles that are approximately 0.25 millimeters to approximately 4 millimeters in size.

4. The separation cartridge of claim 1 wherein the particles are a plurality of sizes.

5. The separation cartridge of claim 1 wherein the particles comprise an exterior surface and a plurality of channels that open onto the exterior surface and define internal surfaces.

6. The separation cartridge of claim 5 wherein the channels have a mean size of approximately 0.01 microns to approximately 100 microns.

7. The separation cartridge of claim 5 wherein the particles are approximately 15% porous to approximately 70% porous.

8. The separation cartridge of claim 1 wherein the baffle filter is in contact with the packed bed.

9. The separation cartridge of claim 1 wherein the cartridge is approximately 2.5 centimeters to approximately 6.4 centimeters wide.

10. The separation cartridge of claim 1 wherein the cartridge is approximately 3.8 centimeters to approximately 4.8 centimeters wide.

11. The separation cartridge of claim 1 wherein the kitchen hood system is used to vent the gas stream into the atmosphere.

12. The separation cartridge of claim 1 comprising a frame which is used to hold the baffle filter and the packed bed together.

13. The separation cartridge of claim 12 wherein one or both of the baffle filter or the packed bed is configured to be easily removed from the frame.

14. The separation cartridge of claim 12 wherein the baffle filter, the packed bed, and the frame are fixedly coupled together.

15. The separation cartridge of claim 12 wherein the frame encloses the baffle filter and the packed bed.

16. The separation cartridge of claim 1 wherein the baffle filter is configured to be received by upper and lower railings in the kitchen hood system and the packed bed is configured to protrude outward from a plane defined by the upper and lower railings.

17. The separation cartridge of claim 16 wherein the cartridge is approximately 6.35 centimeters to approximately 19 centimeters wide.

18. The separation cartridge of claim 1 wherein a height of a first portion of a side of the cartridge is greater than a height of a second portion of the side of the cartridge, the first portion of the side corresponds to a portion of the cartridge that comprises the baffle filter and the second portion of the side corresponds to a portion of the cartridge that comprises the packed bed, the first portion of the side being configured to be received by upper and lower railings of a hood.

19. The separation cartridge of claim 1 wherein the packed bed is at least substantially flat.

20. The separation cartridge of claim 1 wherein the particles in the packed bed of particles are maintained in a rigid enclosure which is independent of the baffle filter.

21. The separation cartridge of claim 1 wherein the baffle filter includes a first side having a plurality of openings and a second side which is spaced apart from and positioned opposite the first side, and wherein the baffle filter includes baffle members configured to deflect the gas stream, the baffle members being positioned to extend outward from at lean one of the first side or the second side.

22. The separation cartridge of claim 1 wherein the gas stream passes through the packed bed of particles and exits the separation cartridge without passing through any additional baffle filters.

23. The separation cartridge of claim 1 wherein the particles are not combustible at 1000° C.

24. The separation cartridge of claim 1 wherein the particles comprise a transition metal oxide, zircon, silica, alumina, alumina-silica, or combinations thereof.

25. The separation cartridge of claim 24 wherein the particles comprise at least one of kaolin, bentonite, montmorillonite, or combinations thereof.

26. A separation cartridge comprising:
   a plurality of physically separate filters each of which includes a separation medium, wherein the plurality of filters are coupled together to form the separation cartridge, wherein at least one of the filters includes a packed bed of particles, the particles including at least one of an oxide ceramic material or a metal, and wherein the separation cartridge is used to separate an entrained oleo substance from a gas stream in a kitchen hood system.

27. The separation cartridge of claim 26 wherein the cartridge includes only two filters.

28. The separation cartridge of claim 26 wherein at least one of the plurality of filters includes a baffle filter.

29. The separation cartridge of claim 26 wherein the kitchen hood system is used to vent the gas stream into the atmosphere.

30. The separation cartridge of claim 26 wherein the plurality of filters includes a mesh filter.

31. The separation cartridge of claim 28 wherein the baffle filter is in contact with the packed bed.

32. The separation cartridge of claim 26 wherein the packed bed is at least substantially flat.

33. The separation cartridge of claim 26 wherein the packed bed is pleated.

34. The separation cartridge of claim 26 wherein the particles are maintained in a rigid enclosure which is separate from at least one of the remainder of the plurality of filters in the separation cartridge.

35. The separation cartridge of claim 26 wherein the particles absorb the oleo substance.

36. The separation cartridge of claim 26 wherein the cartridge is configured to be mounted between opposing, U-shaped railings in the kitchen hood which are each approximately 1.3 centimeters to approximately 7.6 centimeters wide.

37. The separation cartridge of claim 26 wherein at least one of the plurality of filters is configured to be easily removed from the cartridge.

38. The separation cartridge of claim 26 wherein the plurality of filters includes a plurality of perforated plates which are spaced apart from each other.

39. The separation cartridge of claim 26 wherein the particles include porous inorganic particles.

40. The separation cartridge of claim 26 wherein the particles include particles tat are approximately 0.25 millimeters to approximately 4 millimeters in size.

41. The separation cartridge of claim 26 wherein the gas stream passes through the packed bed of particles and exits the separation cartridge without passing through any additional filters.

42. A separation system comprising:
a kitchen hood including a first railing and a second railing, the first railing being positioned opposite the second railing; and
a cartridge comprising a plurality of separation mediums including a bed of particles, the particles being held by a rigid enclosure which is independent of at least one of the remainder of the plurality of separation mediums, the plurality of separation mediums being used to separate one or more entrained oleo substances from the air;
wherein the first railing and the second railing are used to hold the plurality of separation mediums.

43. The separation system of claim 42 wherein the plurality of separation mediums include a baffle filter.

44. The separation system of claim 42 comprising ductwork coupled to the kitchen hood, wherein a catalytic converter is positioned in the ductwork.

45. The separation system of claim 43 wherein the baffle filter is in contact with the bed of particles.

46. The separation system of claim 42 wherein the first railing and the second railing are each substantially U-shaped and approximately 1.3 centimeters to approximately 7.6 centimeters wide.

47. The separation system of claim 42 wherein the first railing and the second railing are each substantially U-shaped and approximately 3.5 centimeters to approximately 5.1 centimeters wide.

48. The separation system of claim 42 wherein the first railing and the second railing have a substantially U-shaped cross section.

49. The separation system of claim 42 wherein the bed of particles is at least substantially flat.

50. The separation system of claim 42 wherein the bed of particles is pleated.

51. The separation system of claim 42 wherein the particles comprise at least one of a ceramic material or a metal.

52. The separation system of claim 42 wherein the particles absorb the oleo substance.

53. The separation system of claim 42 wherein the cartridge includes a frame that is used to hold the plurality of separation mediums.

54. The separation system of claim 42 wherein the plurality of separation mediums includes a plurality of perforated plates which are spaced apart from each other.

55. The separation system of claim 42 wherein the particles include porous inorganic particles.

56. The separation system of claim 42 wherein the particles include particles that are approximately 0.25 millimeters to approximately 4 millimeters in size.

57. The separation cartridge of claim 42 wherein the air passes through the bed of particles and exits the cartridge without passing through any additional separation mediums.

58. A separation cartridge comprising:
a first means for separating an entrained oleo substance from a gas stream in a kitchen hood using a baffle filter;
a second means for separating an entrained oleo substance from a gas stream in a kitchen hood using a packed bed of particles, the particles being enclosed in a rigid enclosure which is separate from the baffle filter of the first means; and
a frame used to hold the first and second means together to form the cartridge;
wherein the cartridge is removable from the kitchen hood.

59. A separation cartridge comprising:
a baffle filter; and
a second filter having a rigid enclosure that encloses a plurality of particles to form a bed of particles, the second filter being independent of the baffle filter end coupled together with the baffle filter to form the separation cartridge;
wherein the cartridge is used to separate one or more entrained oleo substances from a gas stream in a kitchen hood system.

60. The separation cartridge of claim 59 wherein the particles comprise at least one of a ceramic material or a metal.

61. The separation cartridge of claim 59 wherein the bed of particles is pleated.

62. The separation cartridge of claim 59 wherein the particles include porous inorganic particles.

63. The separation cartridge of claim 59 wherein the particles are solid.

64. The separation cartridge of claim 59 wherein the baffle filter is in contact with the bed of particles.

65. The separation cartridge of claim 59 wherein the cartridge is approximately 2.5 centimeters to approximately 6.4 centimeters wide.

66. The separation cartridge of claim 59 wherein the kitchen hood system is used to vent the gas stream into the atmosphere.

67. The separation cartridge of claim 59 wherein the bed of particles is at least substantially flat.

68. The separation cartridge of claim 59 wherein the particles absorb the oleo substance.

69. The separation cartridge of claim 59 wherein the cartridge is configured to be mounted between opposing U-shaped railings in the kitchen hood which are approximately 1.3 centimeters to approximately 7.6 centimeters wide.

70. The separation cartridge of claim 59 wherein the particles include particles that are approximately 0.25 millimeters to approximately 4 millimeters in size.

71. The separation cartridge of claim 59 wherein the baffle filter includes a first side having a plurality of openings and a second side which is spaced apart from and positioned opposite the first side, and wherein the baffle filter includes baffle members configured to deflect the gas stream, the batik members being positioned to extend outward from at least one of the first side or the second side.

72. The separation cartridge of claim 59 wherein the gas stream passes through the bed of particles and exits the separation cartridge without passing through any additional baffle filters.

73. A system comprising:
a kitchen hood; and
a cartridge that includes at least two filters, the filters comprising first filter including a bed of particles and at least one additional filter, the first filter including a rigid enclosure that holds the particles in the bed of particles and is independent of the at least one additional filter;
wherein the cartridge is positioned in the kitchen hood to separate an oleo substance from a gas stream which passes through the kitchen hood.

74. The system of claim 73 wherein the bed of particles is removable from the cartridge.

75. The system of claim 73 wherein the additional filter is a baffle filter.

76. The system of claim 73 wherein the bed of particles is at least substantially flat.

77. The system of claim 73 wherein the bed of particles is pleated.

78. The system of claim 73 wherein the particles comprise at least one of a ceramic material or a metal.

79. The system of claim 73 wherein the kitchen hood includes a first railing and a second railing positioned opposite the first railing, wherein the first railing and the second railing are substantially U-shaped, and wherein the first railing and the second railing are used to support the cartridge.

80. The system of claim 79 wherein the first and second railings are each approximately 3.5 centimeters to approximately 5.1 centimeters wide.

81. The system of claim 73 wherein the additional filter and the bed of particles are in contact wit each other in the cartridge.

82. The system of claim 73 wherein the particles include porous inorganic particles.

83. The system of claim 73 wherein the particles include particles that are approximately 0.25 millimeters to approximately 4 millimeters in size.

84. The separation cartridge of claim 73 wherein the gas stream passes trough the bed of particles and exits the separation cartridge without passing through any additional filters.

85. A system comprising:
a kitchen hood including a railing having a substantially U-shaped cross section;
a baffle filter; and
a bed of particles which is used to separate one or more entrained oleo substances from a gas stream which passes through the kitchen hood, the particles being held in a rigid enclosure which is independent of the baffle filter;
wherein the railing is used to support the baffle filter and the bed of particles in the kitchen hood.

86. The system of claim 85 wherein the bed of particles is at least substantially flat.

87. The system of claim 85 wherein the particles comprise at least one of a ceramic material or a metal.

88. The system of claim 85 wherein the particles absorb the oleo substance.

89. The system of claim 85 wherein the baffle filter is in contact with the bed of particles.

90. The system of claim 85 wherein the kitchen hood is used to vent the gas stream into the atmosphere.

91. The system of claim 85 wherein the particles include porous inorganic particles.

92. The system of claim 85 wherein the baffle filter and the bed of particles are included in a cartridge that is supported by the railing.

93. The system of claim 92 wherein one or both of the baffle filter and the bed of particles is configured to be easily removed from the cartridge.

94. The system of claim 85 wherein the particles include particles that are approximately 0.25 millimeters to approximately 4 millimeters in size.

95. The system of claim 85 wherein the railing is a first railing and the kitchen hood includes a second railing positioned opposite the first railing, and wherein the first railing and the second railing are used to hold the baffle filter and the bed of particles in the kitchen hood.

96. The separation cartridge of claim 85 wherein the baffle filter includes a first side having a plurality of openings and a second side which is spaced apart from and positioned opposite the first side, and wherein the baffle filter includes baffle members configured to deflect the gas stream, the baffle members being positioned to extend outward from at least one of the first side or the second side.

97. A separation cartridge comprising:
a baffle filter; and
a bed of particles, the particles being enclosed in a rigid enclosure which is independent of the baffle filter;
wherein the baffle filter and the bed of particles are coupled together to form the separation cartridge that is used to separate one or more entrained oleo substances from a gas stream in a kitchen hood; and
wherein no additional filters are positioned between the baffle filter and the bed of particles in the separation cartridge.

98. The separation cartridge of claim 97 wherein the particles comprise at least one of a ceramic material or a metal.

99. The separation cartridge of claim 97 wherein the bed of particles is pleated.

100. The separation cartridge of claim 97 wherein the particles include porous inorganic particles.

101. The separation cartridge of claim 97 wherein the particles are solid.

102. The separation cartridge of claim 97 wherein the baffle filter is in contact with the bed of particles.

103. The separation cartridge of claim 97 wherein the cartridge is approximately 2.5 centimeters to approximately 6.4 centimeters wide.

104. The separation cartridge of claim 97 wherein the kitchen hood is used to vent the gas stream into the atmosphere.

105. The separation cartridge of claim 97 wherein the bed of particles is at least substantially flat.

106. The separation cartridge of claim 97 wherein the particles absorb the oleo substance.

107. The separation cartridge of claim 97 wherein the cartridge is configured to be mounted between opposing U-shaped railings in the kitchen hood which are approximately 1.3 centimeters to approximately 7.6 centimeters wide.

108. The separation cartridge of claim 97 wherein the particles include particles that are approximately 0.25 millimeters to approximately 4 millimeters in size.

109. The separation cartridge of claim 97 wherein the baffle filter includes a first side having a plurality of openings and a second side which is spaced apart from and positioned apposite the first side, and wherein the baffle filter includes baffle members configured to deflect the gas stream, the baffle members being positioned to extend outward from at least one of the first side or the second side.

110. The separation cartridge of claim 97 wherein the gas stream passes through the bed of particles and exits the separation cartridge without passing through any additional baffle filters.

* * * * *

UNITED STATES PATENT AND TRADEMARK OFFICE
CERTIFICATE OF CORRECTION

PATENT NO. : 7,041,159 B2  
APPLICATION NO. : 10/632805  
DATED : May 9, 2006  
INVENTOR(S) : Majid Entezarian et al.

Page 1 of 1

It is certified that error appears in the above-identified patent and that said Letters Patent is hereby corrected as shown below:

Title Page:
Item [75], Inventors, add James R. Johnson, Lady Lake FL (US)

Column 22:
line 27, replace "lean" with --least--.

Column 23:
line 19, replace "tat" with --that--.

Column 24:
line 27, replace "end" with --and--.

Column 25:
line 1, replace "batik" with --baffle--.
line 10, insert --a-- between "comprising" and "first".
line 37, replace "wit" with --with--.
line 45, replace "trough" with --through--.

Column 27:
line 2, replace "apposite" with --opposite--.

Signed and Sealed this

Fifteenth Day of August, 2006

JON W. DUDAS  
*Director of the United States Patent and Trademark Office*